United States Patent
Loa et al.

(10) Patent No.: US 7,616,632 B2
(45) Date of Patent: Nov. 10, 2009

(54) SYSTEM AND METHOD OF IMPLEMENTING CONTACTS OF SMALL WORLDS IN PACKET COMMUNICATION NETWORKS

(76) Inventors: Kanchei Loa, 3146 E. Rock Wren Rd., Phoenix, AZ (US) 85048; Michael Sugino, 1512 N. 88th Pl., Mesa, AZ (US) 85207

( * ) Notice: Subject to any disclaimer, the term of this patent is extended or adjusted under 35 U.S.C. 154(b) by 797 days.

(21) Appl. No.: 10/891,872

(22) Filed: Jul. 15, 2004

(65) Prior Publication Data

US 2005/0053014 A1 Mar. 10, 2005

Related U.S. Application Data

(60) Provisional application No. 60/490,334, filed on Jul. 25, 2003.

(51) Int. Cl.
*H04L 12/28* (2006.01)
(52) U.S. Cl. .................. 370/389; 370/252; 370/401; 370/408
(58) Field of Classification Search ............. 370/352, 370/392, 229, 389, 232
See application file for complete search history.

(56) References Cited

U.S. PATENT DOCUMENTS

| | | | |
|---|---|---|---|
| 7,088,718 B1 * | 8/2006 | Srivastava | 370/392 |
| 7,120,151 B1 * | 10/2006 | Ginjpalli et al. | 370/395.1 |
| 7,180,866 B1 * | 2/2007 | Chartre et al. | 370/242 |
| 2002/0031131 A1 | 3/2002 | Yemini et al. | |
| 2002/0172155 A1 * | 11/2002 | Kasvand-Harris et al. | 370/229 |
| 2005/0169236 A1 * | 8/2005 | Chopping et al. | 370/351 |

* cited by examiner

*Primary Examiner*—Simon Sing
*Assistant Examiner*—Simon King
(74) *Attorney, Agent, or Firm*—Fliesler Meyer LLP

(57) ABSTRACT

A small world infrastructure (SWI) of a general packet communications network and a method of determining, establishing and maintaining a hierarchical forwarding path (HFP) interconnecting communications units (CUs) of the small world infrastructure. The SWI includes a domain that has a given communication unit CU as a message packet source, a plurality of associated communications units each in direct contact with the given CU, and a plurality of HFPs each providing the direct contact between the given CU and one of the associated CUs, respectively. The method includes providing these communications units in which there are HFPs between first and second CUs and between the second and the third CUs, and a third HFP is constructed between the first and the third CUs.

26 Claims, 34 Drawing Sheets

| Seq no. | Lvl 4 | Lvl 3 | Lvl 2 | Lvl 1 |
|---|---|---|---|---|
| 1 | L(3,1) | L(2,1) | L(1,1) | L(0,1) |
| 2 | L(3,1) | L(2,1) | L(1,1) | L(0,2) |
| 3 | L(3,1) | L(2,1) | L(1,1) | X |
| 4 | L(3,1) | L(2,1) | X | L(0,3) |
| 5 | L(3,1) | L(2,1) | X | L(0,4) |
| 6 | L(3,1) | L(2,1) | X | X |
| 7 | L(3,1) |  | L(1,2) | L(0,5) |
| 8 | L(3,1) |  | L(1,2) | L(0,6) |
| 9 | L(3,1) |  | L(1,2) | X |
| 10 | L(3,1) |  | X | L(0,7) |
| 11 | L(3,1) |  | X | L(0,8) |
| 12 | L(3,1) |  | X | X |
| 13 |  |  |  | L(0,9) |
| 14 |  |  |  | L(0,10) |
| 15 |  |  |  | X |
| 16 |  |  | L(1,4) | L(0,11) |
| 17 |  |  | L(1,4) | L(0,12) |
| 18 |  |  | L(1,4) | X |
| 19 |  |  | X | L(0,13) |
| 20 |  |  | X | L(0,14) |
| 21 |  |  | X | X |

SYSTEM AND METHOD OF IMPLEMENTING CONTACTS OF SMALL WORLDS IN PACKET COMMUNICATION NETWORKS

PRIORITY CLAIM

This application claims priority under 35 U.S.C. 119(e) to U.S. Provisional Patent Application No. 60/490,334, filed Jul. 25, 2003, entitled "System and Method of Implementing Contact of Small Worlds in Packet Communication Networks," which is incorporated herein by reference.

FIELD OF USE

This invention relates to communication systems, specifically methods and systems for determining and establishing a communication path in information transport networks.

BACKGROUND OF THE INVENTION

Current communication systems are extremely large networks of interconnected Communication Units (CUs) approaching complexities and scale of unmanageable magnitude. These systems are comprised of a hybrid mix composed of wire line and wireless transport networks which are fixed (stationary), movable (reconfigurable fixed), portable (slow mobility) and mobile (fast mobility). The architecture of various types of CUs forming the system network is constantly changing and evolving adding to the complexity.

Packet based architectures for the efficient routing, forwarding, and switching of data flows are non-existent which also exhibit flexibility and scalability over a multiplicity of network protocols, granularity, applications and hardware. With the current evolution of the Internet as a global communication infrastructure, the inherit design imposes challenging constraints in supporting emerging services in the wire line and wireless networks.

The primary network infrastructure including the Internet was constructed around a very simple point to point communication model. Network intelligence was assigned to the network routing nodes, while the end point devices were assumed independent from the transport decision tasks. The network nodes would perform all transport forwarding tasks and decisions. This simple two-tier model has allowed these infrastructures to evolve without efficiency or scalability issues to current magnitudes with little issues.

Research from social networking has resulted in the concepts of "small worlds" theory where contact relationships and acquaintance metrics reduce the degrees of separation between entities. This can drastically reduce the path length of large complex networks to a very manageable practical size.

A subset of a relationship graph is shown in FIG. 1. Nodes represent entities with their associated relational contacts. The number of degrees of separation is the number of hops between two entities. Node 50 has relational associations or contacts with nodes 54, 58, 62, 66 and 70 shown by links 52, 56, 60, 64 and 68, respectively. There are other links associated via links 72 and 74. If the node of interest is node 94, a relationship path discovered through contact links would be node 66 via link 64, node 78 via link 76, node 82 via link 80, node 86 via link 84, node 90 via 88 and the node of interest 94 via link 94. This illustrates six degrees of separation between node 50 and node 94.

Emerging communication networks have been exploiting results from small world concepts to attempt to reduce large complex networks to a reasonable small world network. Several new architectures have been introduced in the research community that attempt to create a small world in large-scale networks. These architectures are based on defining relational contacts for network nodes. The contacts form short cuts in the communications path, which represent logical connections that translate into multiple physical hops.

A particular node will have its own set of contact information, which may encompass many different sets of other nodes, depending on the particular relational attribute being exploited. But for a given set of contacts there will be a set of first contacts or single hop links or nodes of one degree of separation. This represents the initial known contacts and forms a one degree contact domain. In FIG. 2 a portion of a contact or relationship graph is shown. For a node of interest, 100, the first contacts, 104, 108, 112, 116, 120, 124, 128, 132 and 136 are shown with their associated relational links to contacts, 102, 106, 110, 114, 118, 122, 126, 130 and 134, respectively. This resulting one degree contact domain is shown as 156.

This virtual contact domain concept may be extended to encompass nodes of multiple degrees of freedom. In FIG. 2 a first contact node, 136 is chosen for illustration purposes. Node 136 has a one degree contact domain, 158, comprised of nodes 132, 140, 144, 148, 104, 108 and 100 with associated links, 154, 138, 142, 146, 150, 152 and 134, respectively. If this is extended for all nodes in the one degree contact domain for node 100, the resulting two degree contact domain, 160 is formed. This will result in increased efficiency in finding a node within a domain.

As the number of degrees of freedom or as virtual reach of the contact domain increases, the probability of finding the destination node increases, because the contact domains will overlap. In FIG. 3 several nodes, 170, 174, 180 and 186 and their associated two degree contact domains, 172, 176, 182 and 188, respectively are shown. Domain 172 overlaps domain 176 resulting in an overlap 178, domain 176 overlaps domain 182 resulting in an overlap 184 and domain 188 is outside domains 172, 176 and 182. Source node 170 would be capable of finding any destination in contact domain 176 via contacts in 178 and for destinations in contact domain 182, contacts via 178, 176 and 184 would be utilized. For destinations in contact domain 188, no destinations could be found utilizing contact information.

Extending the number of degrees of separation is accomplished at a penalty of increased resources for maintaining contact information within a domain. If the extent is insufficient, the probability of reaching the destination is very low utilizing contact information only unless some means is incorporated for maintaining contact outside of the domain.

With the introduction of wireless nodes into the network, spatial dependencies due to radio transceiver efficiencies become a necessary consideration. Mobility will add time dependencies as an additional mandatory parametric factor. Both location and time are relational attributes, but maintain required parametric presence if wireless mobility is incorporated into the communication infrastructure. This adds significant complexity to conventional discovery methodologies, but becomes a natural extension of the small world concept as only an added relational attribute.

A portion of a relational graph is shown in FIG. 4. For illustrative simplicity, only node 194 will be mobile. The source node 190 with its associated two degree contact domain 192 and the mobile node 194 with its associated two degree contact domain 196 are shown in their initial state. The domains overlap 198 and destination discovery is guaranteed. The node 194 is moving away from node 190. In FIG. 5, at a later time, node 194 has moved along the path 200 and is shown as node 202 in its new position within the relational graph. Node 202 has a new two degree contact domain 204 associated with its new position. The new domain still overlaps 192 and is shown as 206. This will still insure destination discovery of node 202 (old node 194). With further movement of node 202 along path 208, its new position is shown as node 210 in FIG. 6. The new two degree contact domain 212 no longer overlaps 192. If only the nodes within the domain 192 are queried for contact information, discovery of node 210 would be lost. Research has indicated that maintaining a small number of carefully chosen nodes outside the contact domain will significantly increase the coverage. In FIG. 7, a node 214 is chosen as an extension contact node outside of domain 192. This effectively adds the contact domain 216 from node 214 to domain 192. This new coverage now overlaps domain 212 resulting in a discovery of node 210.

These contacts are chosen by various algorithms and/or by taking advantage of mobility or underline routing protocols. The goal of such contacts is to be used during network routing and resource discovery without global flooding. These "smart" contacts, computed by current or future algorithms, out-perform traditional packet routing protocols in simulation studies but have little commercial value without a practical, efficient and robust mechanism to implement these relationship in "real-live" wire line and wireless packet communication networks.

Multi-protocol label switching (MPLS) and generalized multi-protocol label switching (GMPLS) are current technology solutions for addressing performance, management and scalability issues in today's networks. MPLS/GMPLS separate routing from packet forwarding/switching with the use of a simpler paradigm based on label swapping. The separation from routing allows for interfacing to existing layer 2 and layer 3 protocols. The communication path is determined from labels embedded in the packet header. The label determines the Label-Switched Path (LSP) for a packet with local significance only (i.e. next hop).

An illustrative diagram of a MPLS domain is shown in FIG. 8. The network is comprised of an ingress host 220 with multiple data flows to two egress hosts, 222 and 224, interconnected via multiple Label Switching Routers (LSR). Two LSPs, 270 and 272 are shown, one for each data flow. LSR 228 is the ingress point for the host 220. The LSRs located at the edge of a MPLS domain are also classified as a Label Edge Router (LER) due to possible added support for dissimilar networks. Data flows are assigned to a particular Forwarding Equivalency Class (FEC) determined by a set of transport requirements such as service properties and destination address.

As a packet 226 enters the edge LER 228, a FEC is assigned as well as determining the LSP 270 to use. The LSP will determine which label should be added to the packet. LER 228 will forward the packet on the appropriate interface to the determined LSR 232. The labeled packet 230 is received by LSR 232. The incoming interface and label will be used to determine the outgoing interface and new label. The current label is swapped for the new label and forwarded on the appropriate interface to the next LSR 236 for the particular LSP 270. The new labeled packet is received by LSR 236 and processed in a similar manner and forwards a new labeled packet 238 to LSR 240. LSR 240 processes the packet 238 and forwards a new labeled packet 242 to the egress LER 244.

LER 244 perform similar tasks with the exception of stripping the label from labeled packet 242 before forwarding to the appropriate interface for external conventional processing to destination host 222.

Data flows assigned to LSP 272 are processed in a equivalent manner. Packets from host 220 destined for host 224 are processed be LER 228 with a label added for appropriate processing by LSR 232. The labeled packet 250 is processed by 232 and forwarded to LSR 254 as labeled packet 252. LSR 254 processes the packet 252 and forwards the labeled packet 256 to LSR 258. LSR 258 processes packet 256 and forwards the labeled packet 260 to LSR 262. LSR 262 will process packet 260 and forward the labeled packet 264 to LER 266, where the label is stripped and forwarded to the appropriate interface for external processing to destination host 224.

MPLS cannot work without the distribution of the mappings of the incoming interface and label to the outgoing interface and label. Without populating the LSRs throughout the domain, LSPs could not be used, MPLS does not specify a single protocol for distribution of labels or mappings, but allows for multiple solutions. The hop-by-hop LDP (Label Distribution Protocol) for creating LSPs allows high-level relationship attributes being mapped to "real" network services by negotiating and setup on a hop-by-hop basis.

In MPLS label distribution is from the downstream direction. The mappings are towards the source and opposite the direction of data flow. With GMPLS upstream label suggestion is permitted.

With downstream distribution, two possible methodologies are supported, downstream label distribution and downstream-on-demand label distribution. With downstream label distribution, a downstream LSR will assign a label and send its mapping unsolicited to its upstream neighbor for a particular FEC. In FIG. 9 during the creation of a LSP 308 from ingress host 220 to egress host 306, with downstream label distribution LSR 276 would send a mapping 278 to LER 274 upon assignment of the label mapping the interface to the next hop LSR 282 in the LSP 308. Subsequently, LSR 282 would send a mapping 284 for the next hop LSR 288 to LSR 276. This will continue with LSR 288 sending mapping 290 to LSR 282, LSR 294 sending mapping 296 to LSR 288. Finally LER 300 would finish the LSP 308 sending the mapping 302 to LSR 294.

With downstream-on-demand label distribution, the LSR would request a label mapping from the downstream LSR. Following the same LSP 306 in FIG. 9. LER 274 recognizes LSR 276 as the next hop for the FEC and send a request for mapping 280 from LSR 276, which would send back a mapping 278. LSR 276 would send a request 286 to 282 which would send a mapping 284 back. LSR 282 would send a request 292 to 288 which would send a mapping 290 back. LSR 288 would send a request 298 to 294 which would send a mapping 296 back. LSR 294 would send a request 304 to 300 which would send a mapping 302 back terminating the LSP.

However, MPLS is designed for IP flows aggregation from ingress points to egress points. MPLS also assumes that "network reach-ability issues" have been resolved by incorporated routing protocols.

The two-tier model from which current network architectures have been based was envisioned with unicast service provisioning in mind, where the destination was known and fixed. With the evolution of communication systems to include wireless and wire line infrastructures, fixed and mobile nodes, services are becoming more complex. In addition to the basic unicast services, more complex services are emerging such as multicast where there can be multiple source and destination participants, anycast where there is only a single receiver for a particular packet, multihoming where there is more than a single service destination (i.e. multiple service providers), dynamic where the topology will not be constant and mobility where the destination location is not fixed. These new services have failed deployment in the existing infrastructure.

In order to alleviate these shortcomings, several attempts have been made to decouple the source from the destination by introducing a indirection point between the source (sender) and destination (receiver). Most proposed solutions have failed due to scalability issues. An overlay network based solution was proposed, Internet Indirection Infrastructure (I3), using rendezvous based communications.

A rendezvous based network assumes an indirection point, a logical abstraction where a identifier is associated with a rendezvous point between sender and receiver. There are two primitives, send(p) in which a sender would send a packet (id, data) into the network and insert(t) in which a receiver would insert a trigger (id, address) into the network. This id represents the logical abstraction of the rendezvous point. In the I3 network, the overlay network is comprised of I3 servers which act as the rendezvous points. The servers store triggers as well as forward packets.

A rendezvous based I3 network is shown in FIG. 10 comprised of a receiver 310 attached to the network at 312, a sender 318 attached to the network at 320 and an I3 server 316 attached to the network at 314. The receiver 310 would send a trigger 322 to the I3 server 316 with an ID identifying a service packet and the destination address associated with 310 to forward the packet. The sender 318 would send a data packet 324 to the I3 server 316 containing an ID identifying the abstract destination, ID to whom the data packet should be forwarded. The I3 server 316 matches the ID from the data packet 324 with the ID from the trigger 322 and forwards the data packet 326 to the destination address associated with 310 identified in the trigger 322. This is equivalent functionally to a unicast service, but with the sender and receiver decoupled.

For a multicast service, a rendezvous based I3 network is shown in FIG. 11 comprised of multiple receivers, 310 attached to the network at 312, 328 attached to the network at 330 and 332 attached to the network at 334, which are participating as a multicast group. There is also a sender 318 attached to the network at 320 and an I3 server 316 attached to the network at 314. Each receiver in the multicast group 310, 328 and 332 would send a trigger to the I3 server 316. Receiver 310 would send a trigger 322 with an ID identifying a multicast session service packet and the destination address associated with 310 to forward the packet. Receiver 328 would send a trigger 336 with the same ID identifying the same multicast session service packet but the destination address associated with 328 to forward the packet. Receiver 332 would send a trigger 338 with the same ID identifying the same multicast session service packet but the destination address associated with 332 to forward the packet. The sender 318 would send a data packet 324 to the I3 server 316 containing an ID identifying the abstract destination, ID to whom the data packet should be forwarded, in this case the multicast group, but the mechanism is identical to the unicast example. The I3 server 316 matches the ID from the data packet 324 with the ID from the multicast group. The I3 server will forward the packet 326, 340 and 342 to the destination addresses associated with triggers, address for 310 identified in the trigger 322, address for 328 identified in the trigger 336 and address for 332 identified in the trigger 338.

For an anycast service, a rendezvous based I3 network is shown in FIG. 12 comprised of multiple receivers, 310 attached to the network at 312, 328 attached to the network at 330 and 332 attached to the network at 334, which are participating as an anycast group. There is also a sender 318 attached to the network at 320 and an I3 server 316 attached to the network at 314. Each receiver in the anycast group 310, 328 and 332 would send a trigger to the I3 server 316. Receiver 310 would send a trigger 322 with an ID identifying an anycast group session service packet with some of the least significant ID bits unique identifying 310 and the destination address associated with 310 to forward the packet. Receiver 328 would send a trigger 336 with an ID identifying an anycast group session service packet with some of the least significant ID bits unique identifying 328 and the destination address associated with 328 to forward the packet. Receiver 332 would send a trigger 338 with an ID identifying an anycast group session service packet with some of the least significant ID bits unique identifying 332 and the destination address associated with 332 to forward the packet. The ID for each member of the anycast group would have k significant bits identical and associated with the anycast group ID. The sender 318 would send a data packet 324 to the I3 server 316 containing an ID identifying the abstract destination, ID to whom the data packet should be forwarded, in this case the anycast group. The I3 server 316 matches the ID from the data packet 324 with the k significant bits ID from the anycast group. The I3 server will determine by some preset means the best suited receiver to forward the packet. In this case packet 326 would be forwarded to the destination address associated with 310 identified in the trigger 322. This selection could be determined by best prefix matching, QoS or CoS parametrics.

In a mobile application the receiver can change location within the network changing the destination address. A rendezvous based I3 network is shown in FIG. 13 comprised of a receiver 310a at initial location attached to the network at 312, a sender 318 attached to the network at 320 and an I3 server 316 attached to the network at 314. The receiver 310a would send a trigger 322 to the I3 server 316 with an ID identifying a service packet and the destination address associated with 310a to forward the packet. The sender 318 would send a data packet 324 to the I3 server 316 containing an ID identifying the abstract destination, ID to whom the data packet should be forwarded. The I3 server 316 matches the ID from the data packet 324 with the ID from the trigger 322 and forwards the data packet 326 to the destination address associated with 310a identified in the trigger 322. Receiver 310a will move to new location in the I3 network along a path 344. The receiver designated as 310b in its new location will be attached to the network at 346. The receiver 310b would send a trigger 348 to the I3 server 316 with the same ID identifying a service packet and the destination address associated with 310b to forward the packet. The I3 server 316 matches the ID from the data packet 324 with the ID from the trigger 348 and forwards the data packet 350 to the destination address associated with 310b identified in the trigger 348. The rendezvous based communications solution, Internet Indirection Infrastructure is solid in theory and simulations have been very positive. When implemented as an overlay network on top of IP, the solution is not applicable to the "real" Internet. The scheme consists of a set of servers that stores the ID and forwards packets between the sender and receiver. This exhibits very inefficient packet routing in the overlay network because the forwarding path is mixed with ID storage and lookup resulting in serious scalability issues.

Within MPLS networks, various LSPs could converge over portions of the network, sharing forwarding paths. These flows would share labels within this common area. This is known as label merging or flow aggregation. A MPLS domain is shown in FIG. 14 with multiple ingress hosts 360 and 364 with data flows to separate egress hosts 362 an 366 respectively. LSP 408 for the data flow from ingress host 360 to egress host 362 is defined by label mappings 384, 386, 388, 390 and 392. LSP 410 for the data flow from ingress host 364 to egress host 366 is defined by label mappings 398, 400, 402 and 404. LSP 408 and LSP 410 share a common path or merge from LSR 370 to LSR 372 and diverge at LSR 374. In order to maintain flow identity at the divergence point, a mechanism called label stacking was implemented. The level within a stack corresponds to the level within the flow hierarchy. In this example, the labels associated with the mappings 384, 386 and 392 are part of a level 0 stack for LSP 408. The labels associated with mappings 398 and 404 are part of the level 0 stack for LSP 410. In the merged region the labels associated with mappings 400 and 388 would be identical and the labels associated with mappings associated with mappings 402 and 390 would be identical. These two labels would represent level one in the stack for LSP 408 and LSP 410. This illustrates a simple case of a hierarchical LSP concept.

In GMPLS, flow aggregation is a key concept and defined as GMPLS Hierarchical LSP by the IETF. GMPLS extends MPLS beyond packet based switching to also support switching based in the time, wavelength and space domains present in current infrastructures. Within these networks a natural hierarchy exists between Packet Switch Capable (PSC), Time Domain Multiplexing Capable (TDM), Lambda Switch Capable and Fiber Switch Capable (FSC) devices with increasing bandwidth capabilities, respectively. A simplifying constraint exists within this hierarchy which requires that an LSP must begin and end at the same level due to natural equipment support. This massive aggregation of bandwidth requires extremely large amounts of LSPs to support it. The higher levels in the hierarchy require increasing amounts due to this aggregation. The concept of Hierarchical LSP allows the GMPLS network to dramatically reduce the number of LSPs that the higher levels would have to support.

This hierarchical structure is shown in FIG. 15 illustrating GMPLS flow aggregation. This natural hierarchy occurs between the PSC network 420 at level 0, the TDM network 422 at level 1, the LSC network 424 at level 2 and the FSC network 426 at level 3. Because of the termination equipment requirements, there is a natural symmetry to the network hierarchy.

Assuming a particular ingress 428 and egress 430, the hierarchy can be described. The ingress flow enters the PSC network 420 through an interface on one of the ingress PSC nodes 432. PSC 432 would traverse the PSC network until entering a boundary PSC node 434 through link 434. The boundary node 434 would interface to the TDM network 422 via a link 438. The link 438 interfaces with the ingress TDM node 444 where it will be aggregated with other PSC links 440 and 442. This aggregation would be repeated through other ingress TDM nodes from throughout the PSC network 420. This aggregated flow would traverse the TDM network 422 until entering a boundary TDM node 448 through link 446. The boundary node 448 would interface to the LSC network 424 via a link. The link 452 interfaces with the ingress LSC node 454 where it will be aggregated with ingress TDM link 452. This aggregation would be repeated through other ingress LSC nodes from throughout the TDM network 422. This aggregated flow would traverse the LSC network 424 until entering a boundary LSC node 458 through link 456. The boundary node 458 would enter the FSC network 426 via a link 460. The link 460 interfaces with the ingress FSC node 466 where it will be aggregated with other ingress TDM links 462 and 464. The aggregated flow is at the highest level, level 3, in the hierarchy. The flow would traverse the FSC network 426 until entering an egress FSC node 470 through link 468.

The flow would begin traversing down the hierarchy when the aggregated flows are split to the appropriate interfaces and exit the FSC network 426 through links 472 and 474. The flow of interest interfaces with the boundary LSC node 476. The flow would traverse the LSC network 424 until entering an egress LSC node 480 through link 478. The flow would be split to the appropriate interfaces and exit the LSC network 424 through links 482 and 484. The flow of interest interfaces with the boundary TDM node 486. The flow would traverse the TDM network 422 until entering an egress TDM node 490 through link 488. The flow would be split to the appropriate interfaces and exit the TDM network 422 through links 492, 494 and 496. The flow of interest interfaces with the boundary PSC node 498. The flow would traverse the PSC network 420 until entering an egress PSC node 502 through link 500. The flow would exit the network out an interface of egress PSC node 502.

The process of creating the Hierarchal LSP will be shown in FIG. 16 using the same example in FIG. 15 for a flow from ingress 428 to egress 430. When the flow enters the PSC network 420 at ingress node 434, a request 504 for a level 0 LSP 544 from ingress PSC node 434 to egress PSC node 502 would be generated. The request would arrive at the boundary PSC node 438 where a request to ingress TDM node 444 would be generated. With the arrival at the level 1 TDM network 422, a request 506 for a level 1 LSP 542 from ingress TDM node 444 to egress TDM node 490 would be generated. The request would arrive at the boundary TDM node 448 where a request to ingress LSC node 454 would be generated. With the arrival at the level 2 LSC network 424, a request 508 for a level 2 LSP 540 from ingress LSC node 454 to egress LSC node 480 would be generated. The request would arrive at the boundary LSC node 460 where a request to ingress FSC node 466 would be generated. With the arrival at the level 3 FSC network 426, a request 510 for a level 3 LSP 538 from ingress FSC node 466 to egress FSC node 470 would be generated.

Egress FSC node 470 would complete the creation of the level 3 LSP 538 and sends a response 522 back to the requesting ingress FSC node 466. With the completion of the level 3 LSP 538, the request 508 for the level 2 LSP 540 from ingress node 454 is tunneled 524 through the level 3 LSP 538 to boundary LSC node 476 and forwarded to egress LSC node 480. This completes the level 2 LSP 540 and egress LSC node 480 sends a response 526 back to the requesting ingress LSC node 454. With the completion of the level 2 LSP 540, the request 506 for the level 1 LSP 542 from ingress node 444 is tunneled 528 through the level 2 LSP 540 to boundary TDM node 486 and forwarded to egress TDM node 490. This completes the level 1 LSP 542 and egress TDM node 490 sends a response 530 back to the requesting ingress TDM node 444. With the completion of the level 1 LSP 542, the request 504 for the level 0 LSP 544 from ingress node 432 is tunneled 532 through the level 1 LSP 542 to boundary PSC node 498 and forwarded to egress PSC node 502. This completes the level 0 LSP 544 and egress PSC node 502 sends a response 534 back to the requesting ingress PSC node 432. This completes the Hierarchal LSP.

The conventional MPLS LSP is just a sequence of labels or a concatenation of labels. With a Hierarchal LSP (H-LSP), for levels greater than 0, the level n LSP is a sequence or concatenation of lower level LSPs. The level 0 LSP is equivalent to the conventional MPLS labels. A homogeneous H-LSP, LSP (4,1) is shown in FIG. 17 with a constant level depth of 4. The figure depicts a LSP as LSP(n,m) where n is the level number and m is a LSP sequence number within the LSP level n. Labels are indicated as L(n,l) where n is the level number and 1 is a label sequence number within the LSP level n. An X indicates a null to act as a label placeholder at the end of a label sequence of a particular LSP.

For instance, LSP (1,1) is a level 1 LSP and the first level 1 LSP comprised of labels L(0,1), L(0,2) and a null (X) indicating the end of LSP(1,1). For level n>1, the sequence is a concatenation of LSPs of level n−1. LSP(2,1) is a concatenation of LSP(1,1) and LSP(1,2) with label L(1,1) used for LSP(1,1) and a null(X) as a placeholder for LSP(1,2). Similarly for LSP(3,1) is a concatenation of LSP(2,1) and LSP(2,2) with L(2,1) used for LSP(2,1) and null(X) as a placeholder for LSP(2,2). Finally for the level 4 LSP, LSP(4,1) is a concatenation of LSP(3,1) and LSP(3,2) with label L(3,1) used for LSP(3,1) and a null (X) as a placeholder for LSP(3,2). The other LSPs are defined equivalently.

The table in FIG. 17 illustrates the associated label stack corresponding to the sequence from top (ingress) to bottom (egress). At the ingress, sequence 1, for LSP(4,1) which is a hierarchy of level 3, 2, 1 and 0 LSPs, labels L(3,1), L(2,1), L(1,1) and L(0,1) are pushed on the stack. At sequence 2, L(0,1) is swapped for L(0,2). At sequence 3, L(0,2) is swapped for a null (X) to indicate a placeholder for the end of LSP(1,1). At sequence 4, LSP(1,1) will be completed and the level 0 label, X will be popped from the stack. Sequence 4 also corresponds with the creation of LSP(1,2) and the final label for LSP(2,1). To accommodate these events a null(X) to indicate a placeholder for the end of LSP(2,1) and L(0,3) for the creation of LSP(1,2) will be pushed on the stack. At sequence 5, L(0,3) is swapped for L(0,4). At sequence 6, L(0,4) is swapped for a null(X) to indicate a placeholder for the end of LSP(1,2). At sequence 7, LSP(1,2) and LSP(2,1) will be completed and the level 0 label, X as well as the level 1 label, X will be popped from the stack. Sequence 7 also corresponds with the creation of LSP(1,3) and LSP(2,2) as well as the final label for LSP(3,1). To accommodate these events a null(X) to indicate a placeholder for the end of LSP(3,1), L(1,2) for the creation of LSP(2,2) and L(0,5) for the creation of LSP(1,3) will be pushed on the stack. The labels will be swapped, popped and pushed on the stack in a similar manner through the remaining sequence. At sequence 13, LSP(1,4), LSP (2,2) and LSP(3,1) will be completed and the level 0, 1 and 2 labels, X as will be popped from the stack. Sequence 13 also corresponds with the creation of LSP(1,5), LSP(2,3) and LSP(3,2) as well as the final label for LSP(4,1). To accommodate these events a null(X) to indicate a placeholder for the end of LSP(4,1), L(2,2) for the creation of LSP(3,2), L(1,3) for the creation of LSP(2,3) and L(0,9) for the creation of LSP(1,5) will be pushed on the stack. Finally at the egress, sequence 24, for LSP(4,1) all LSPs will be completed and all labels in the stack will be popped at the completion of the sequence.

A H-LSP is not limited to the homogeneous case, but can have variable depths with a the only constraint being for a level n H-LSP, the sequence of concatenated LSPs of depths less than n and greater than 1 must contain at least one LSP with depth n-l. An inhomogeneous level 4H-LSP, LSP(4,1) is shown in FIG. 18 with a variable level depth from 1 to 4. The figure depicts a LSP as LSP(n,m) where n is the level number and m is a LSP sequence number within the LSP level n. Labels are indicated as L(n,1) where n is the level number and 1 is a label sequence number within the LSP level n. An X indicates a null to act as a label placeholder at the end of a label sequence of a particular LSP. The H-LSP initially has a depth of 4 at sequence 1, a depth of 3 at sequence 7, a depth of 1 at sequence 13, a depth of 3 at sequence 16 and the completes at sequence 21. The sequence is a concatenation of a level 3 LSP, LSP(3,1), a level 1 LSP, LSP(1,5) and a level 2 LSP, LSP(2,2). LSP(3,1) is a concatenation of a level 2 LSP, LSP(2,1) and two level 1 LSPs, LSP(1,3) and LSP(1,4). LSP (2,1) is a concatenation of two level 1 LSPs, LSP(1,1) and LSP(1,2). Finally, LSP(2,2) is a concatenation of two LSPs, LSP(1,6) and LSP(1,7).

The table in FIG. 18 illustrates the associated label stack corresponding to the sequence from top (ingress) to bottom (egress). The stack behavior is similar to the homogeneous example in FIG. 17 with the exception of a variable stack depth corresponding to the variable depth of LSPs. For example, at sequence 7, LSP(1,2) and LSP(2,1) will be completed and the level 0 label, X as well as the level 1 label, X will be popped from the stack. Sequence 7 also corresponds with the creation of LSP(1,3). To accommodate these events L(1,2) will be swapped for L(2,1) to indicate the continuation of LSP(2,1) for LSP(3,1) and L(0,5) for the creation of LSP (1,3) will be pushed on the stack. At this point the stack has a depth of 3 instead of 4 corresponding with the reduction in level in the hierarchy. Similarly at sequence 13, LSP(1,4) and LSP(3,1) will be completed and the level 0 label, X as well as the level 1 label, X will be popped from the stack. Sequence 13 also corresponds with the creation of LSP(1,5) and L(0,5) will be pushed on the stack resulting in a stack depth of 1 as well as a level 1 hierarchy. At sequence 16 LSP(1,5) will be completed and the level 0 label, X will be popped from the stack. Sequence 16 also corresponds with the creation of LSP(1,6) and LSP(2,2). To accommodate these events L(1,4) for the creation of LSP(2,2) and L(0,11) for the creation of LSP(1,6) will be pushed on the stack. At this point the stack has a depth of 2 corresponding with the level in the hierarchy. Finally after sequenc231, for LSP(4,1) all LSPs will be completed and all labels in the stack will be popped at the completion of the sequence.

The use of label stacking in a Hierarchical LSP enables concatenation of lower level LSPs, but still requires the means for determining these sequences.

SUMMARY OF THE INVENTION

The first objective of this invention defines a method to determine, establish and maintain a communication path between interconnected communication units (CUs). The communication system is scalable to a very large Integrated Infrastructure (II) environment with integrated wired and wireless services. The Integrated Infrastructure implies that there is no clear border between the wired and wireless domains. Every device is potentially fixed, non-fixed, multi-homed, and mobile nodes interconnected with wired and wireless links. Furthermore, the overall topology of II changes dynamically due to spatial or provisional diversity integrated into various components of the network. The method incorporates an agile, plug and play, fault-tolerant, scalable and secure networking layer that is also incrementally deployable and backward compatible with IP in existing network infrastructures.

The service model provides both indirection and direction services while maintaining the same IP semantics of traditional network infrastructures for backward compatibility. The model incorporates an underlay network supporting a rendezvous based communication abstraction. For indirection services, the rendezvous based communication abstraction decouples the act of sending from the act of receiving without changing existing IP semantics on CUs. For direction services, the sender directly communicates with the receiver maintaining backward compatibility with existing IP forwarding paradigms. The choice of direction or indirection services invoked for a connection and the propagation path is under the control of the source or destination nodes.

The CUs will exhibit many social and physical relationships creating numerous contacts resulting in multiple overlapping small world networks. This invention utilizes these small world contacts to determine the communication path between CUs. These contact relationships are incorporated into the packet communication network as attributes for managing the traffic flows. The influential extension of association is reduced to a manageable domain allowing incorporation of complex provisioning and context attributes.

By defining the Hierarchal Label Switched Path (H-LSP) in a hop-by-hop basis utilizing concatenated relational contacts, the rendezvous based abstraction service model can be implemented utilizing existing forwarding mechanisms (IP or MPLS). This underlay network will be termed as Small World Infrastructure (SWI).

Another objective of this invention is to provide the apparatus to enable the implementation of a Small World Infrastructure underlay network in an efficient, scalable and flexible packet communications system independent of the underlying network routing protocols.

BRIEF DESCRIPTION OF THE DRAWINGS

FIG. 8 illustrates a MPLS domain showing the distribution of label mappings in the creation of a Label Switched Path.

DETAILED DESCRIPTION

A method to determine, establish and maintain a communication path between interconnected communication units (CUs) is an aspect of the invention defined as the Small World Infrastructure (SWI) underlay network. SWI utilizes the relational attributes inherent in the CU of LSPs which are incorporated in a general packet communications network. These relationships or small world contacts determine the paths between source and destination CU of LSPs in the network. These contact paths are implemented as the defining method for composing the Hierarchical Label Switched Path (H-LSP) in a MPLS or GMPLS domain.

Figure 1:
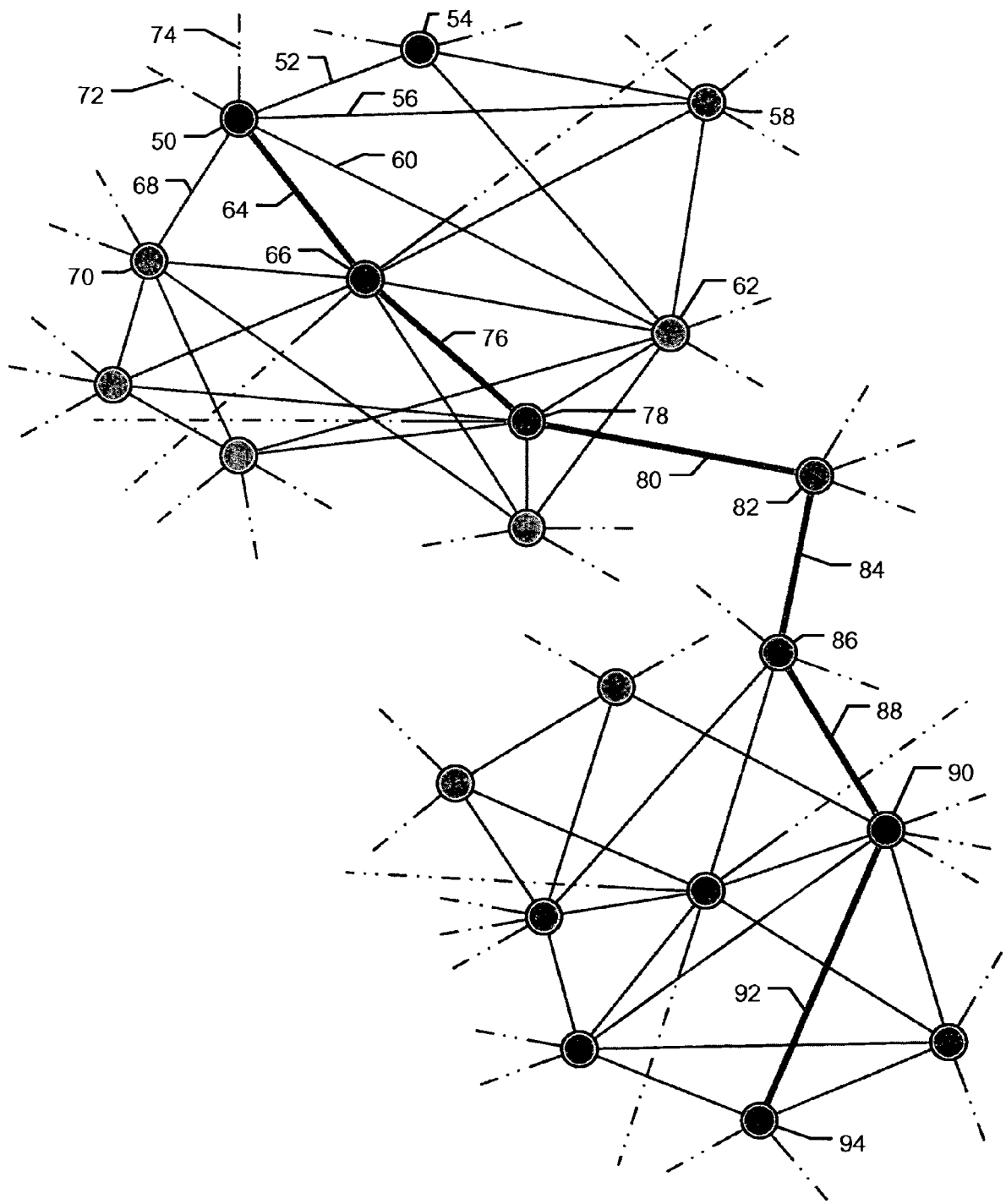
FIG. 1 illustrates the degrees of separation between contacts in a small world relationship graph.
Figure 2:
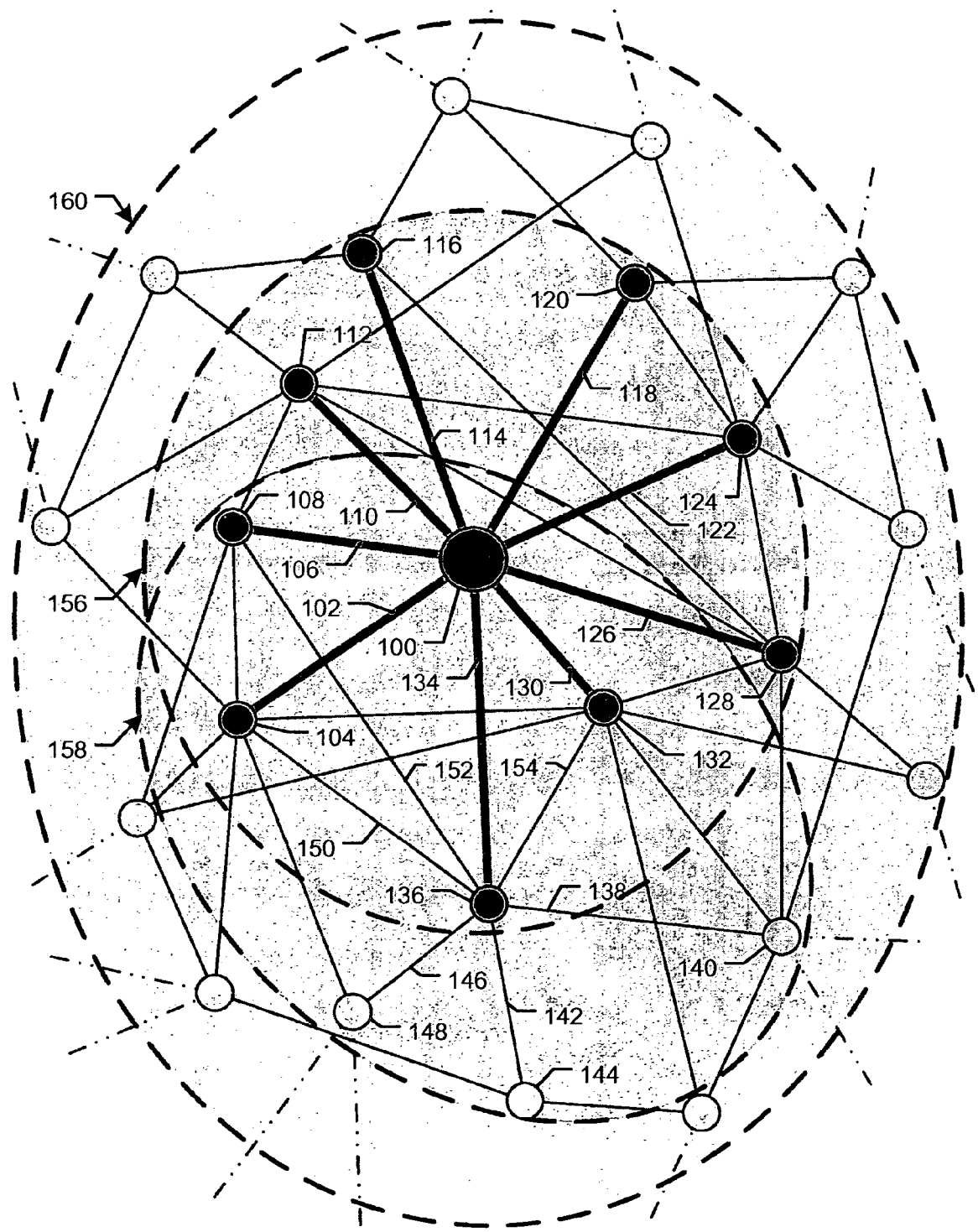
FIG. 2 illustrates the contact domain associated with a node in a small world relationship graph.
Figure 3:
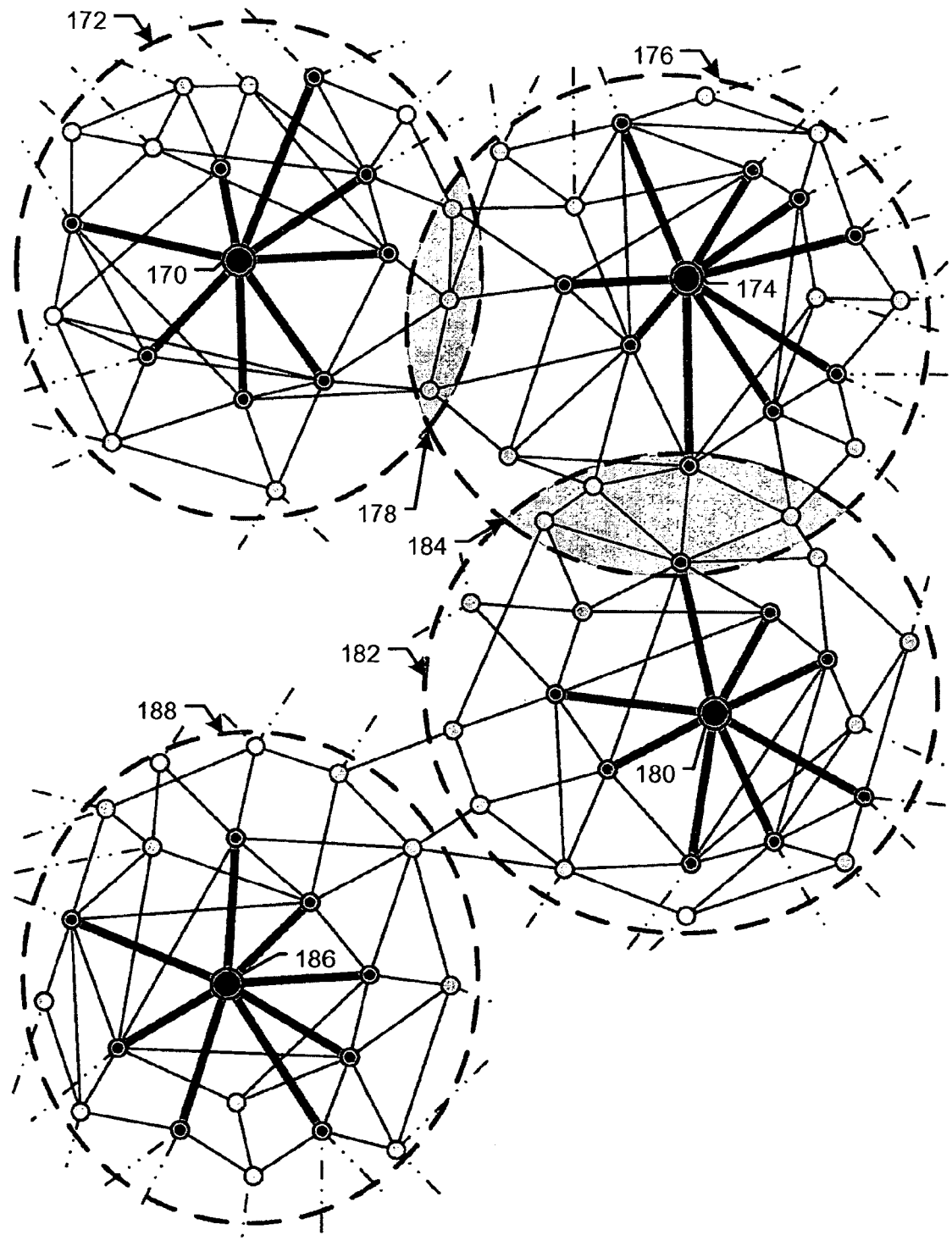
FIG. 3 illustrates the effect of reach in multiple contact domains in a small world relationship graph.
Figure 4:
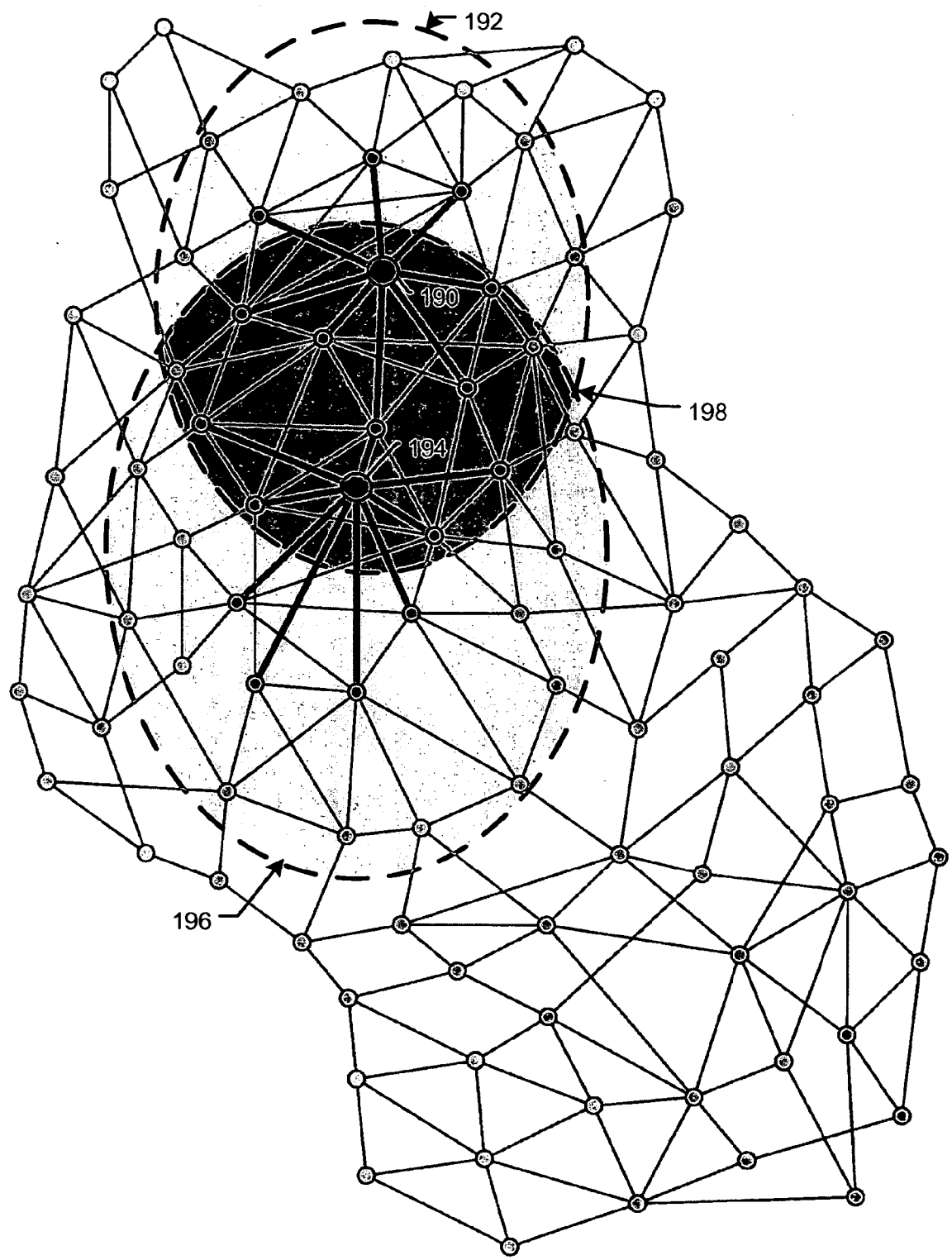
FIG. 4 illustrates a small world relationship graph with a stationary node and a mobile node in its initial position with overlapping contact domains.
Figure 5:
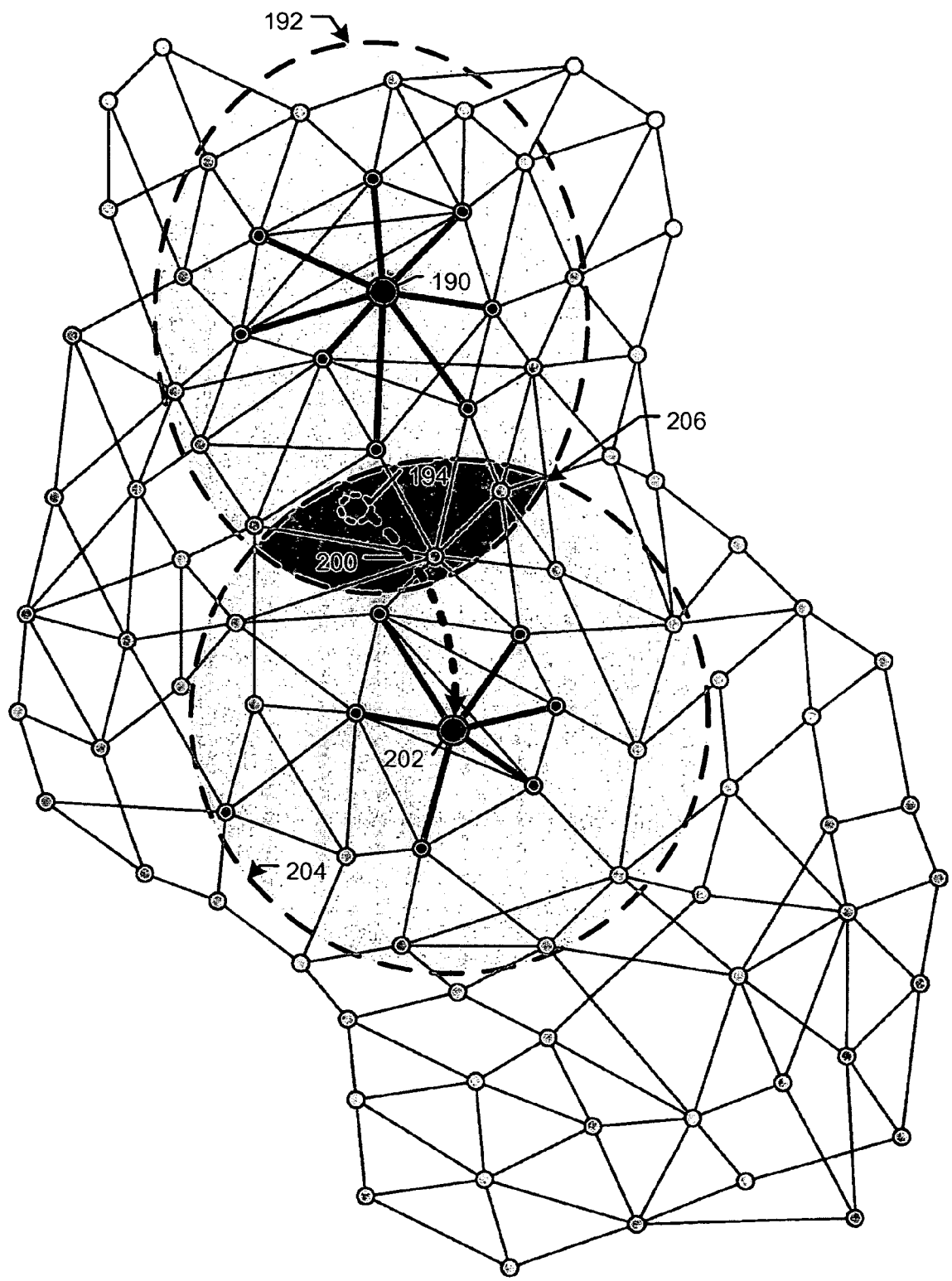
FIG. 5 illustrates a small world relationship graph with a stationary node and a mobile node in an intermediate position with overlapping contact domains.
Figure 6:
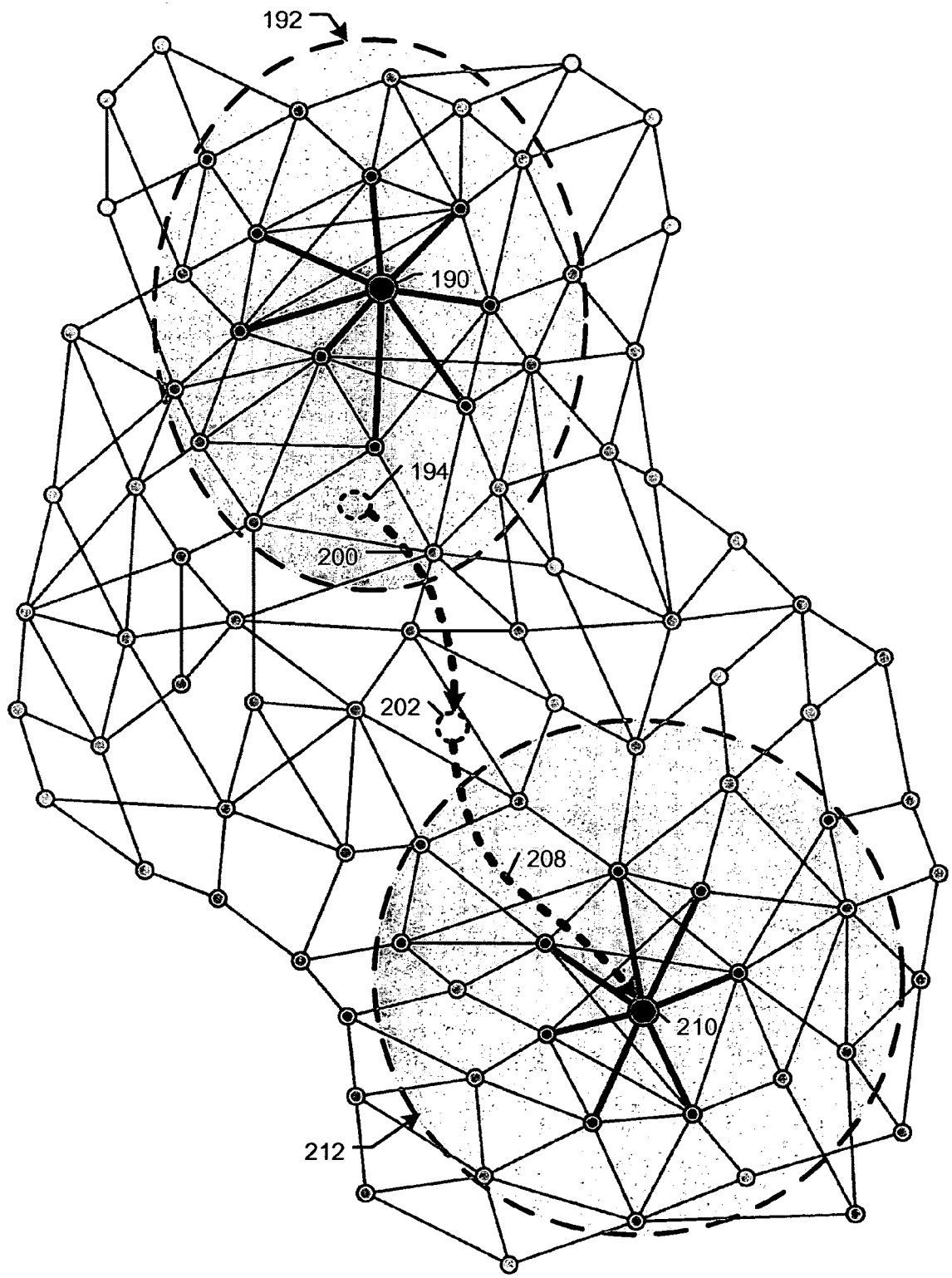
FIG. 6 illustrates a small world relationship graph with a stationary node and a mobile node in an intermediate position with non-overlapping contact domains.
Figure 7:
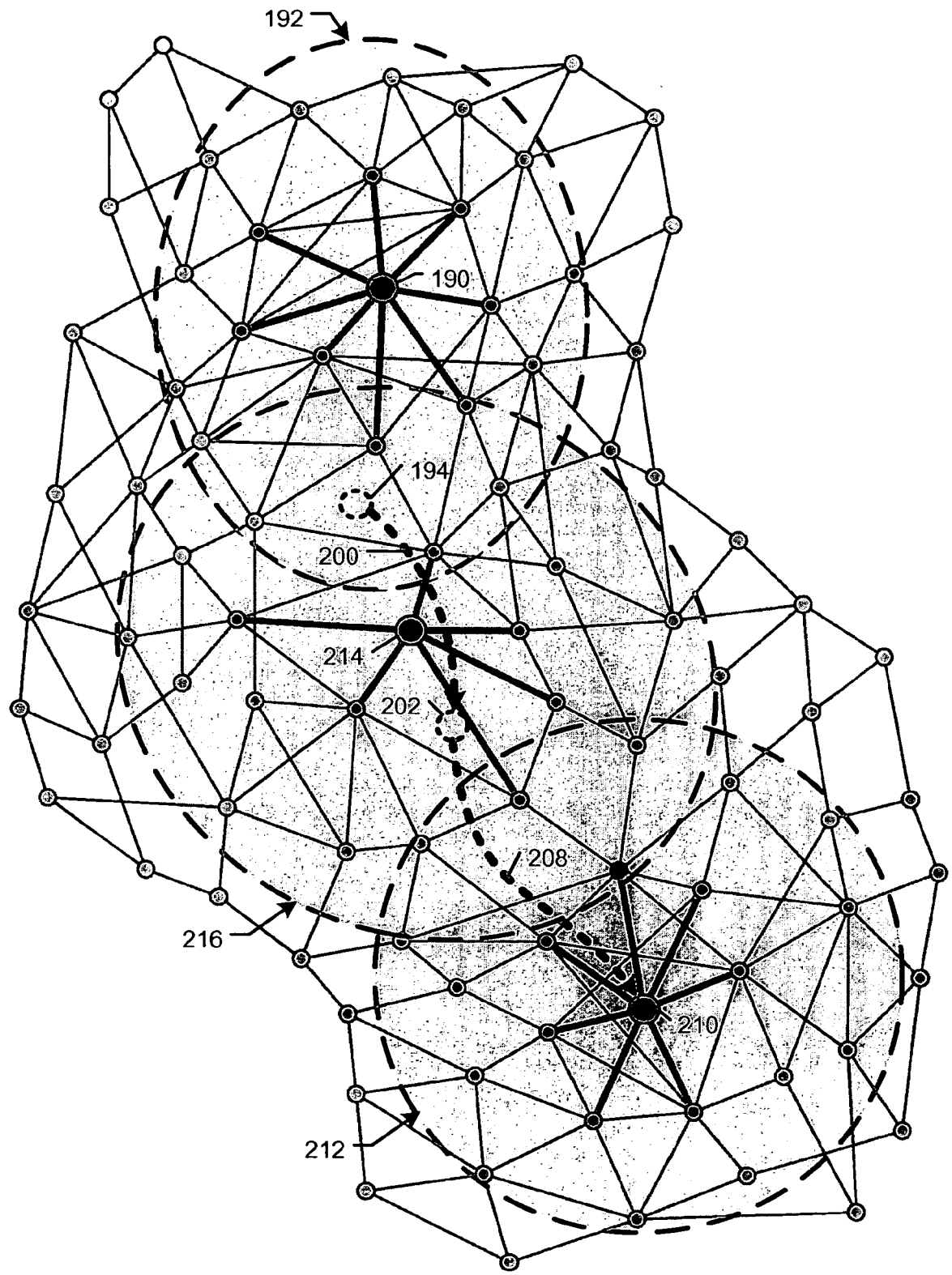
FIG. 7 illustrates a small world relationship graph with a stationary node and a mobile node in an intermediate position with non-overlapping contact domains with the introduction of an extension contact node.
Figure 8:
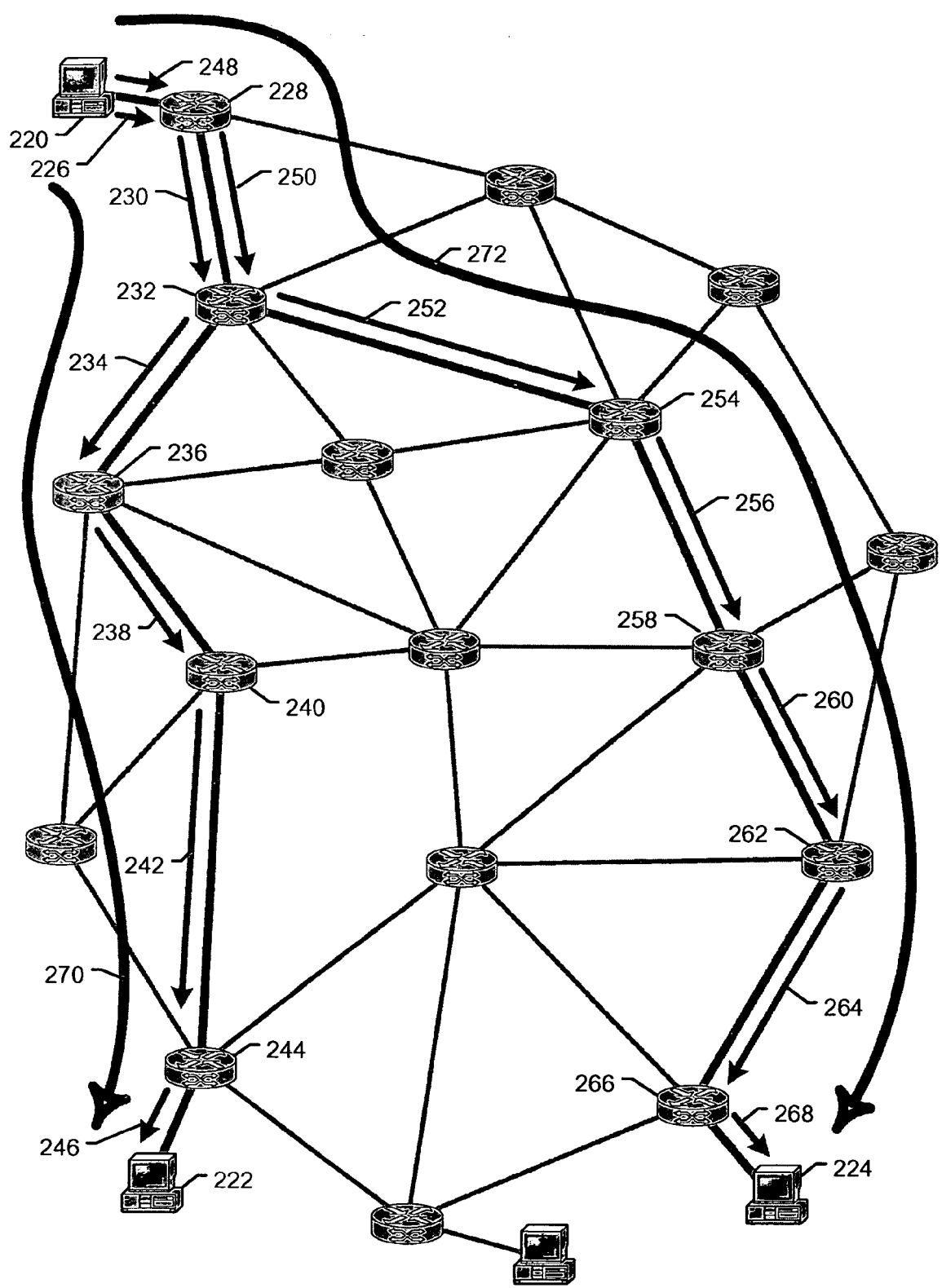
FIG. 8 illustrates a MPLS domain with Multiple Label Switched Paths.
Figure 9:
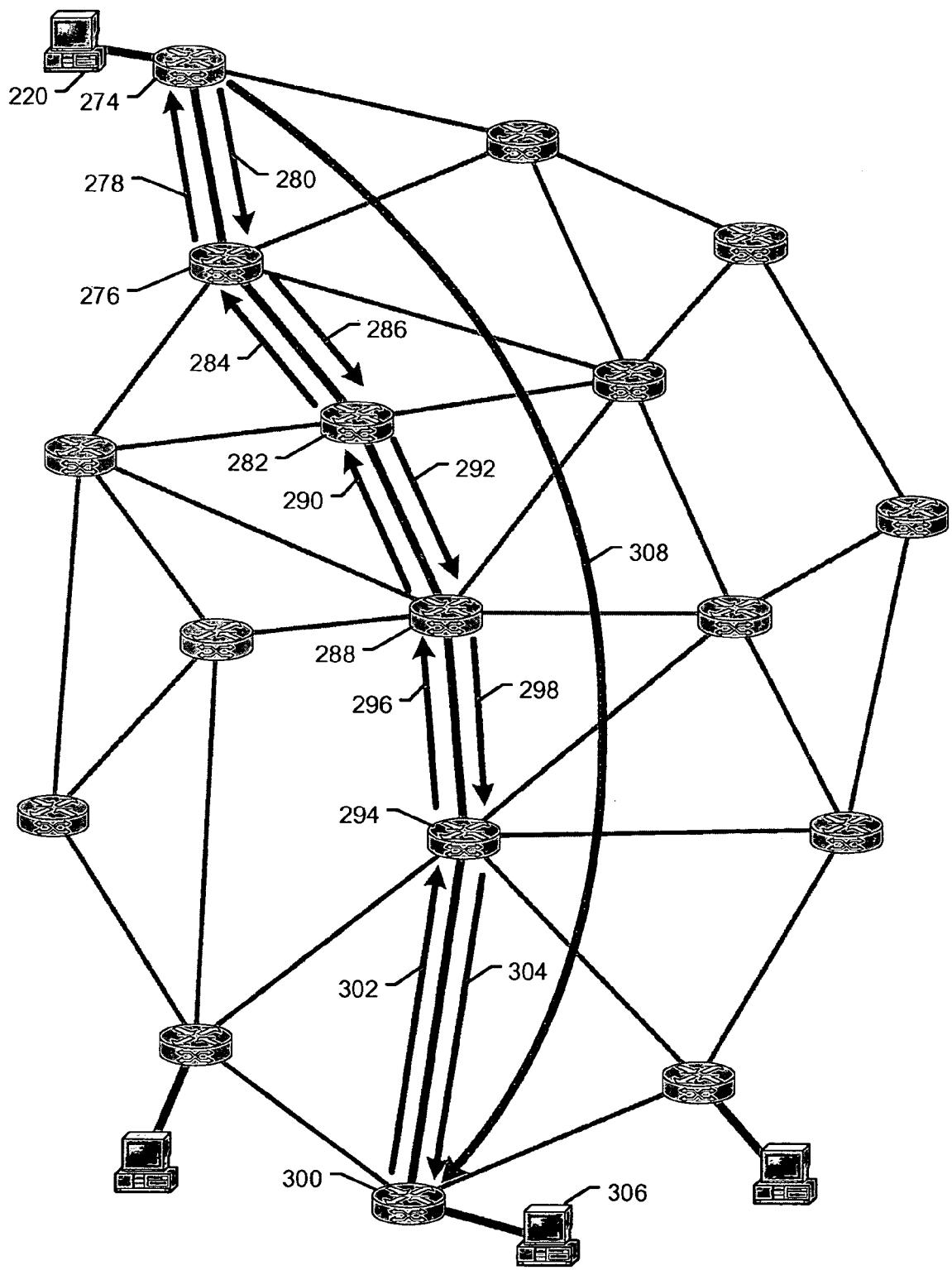
Figure 10:
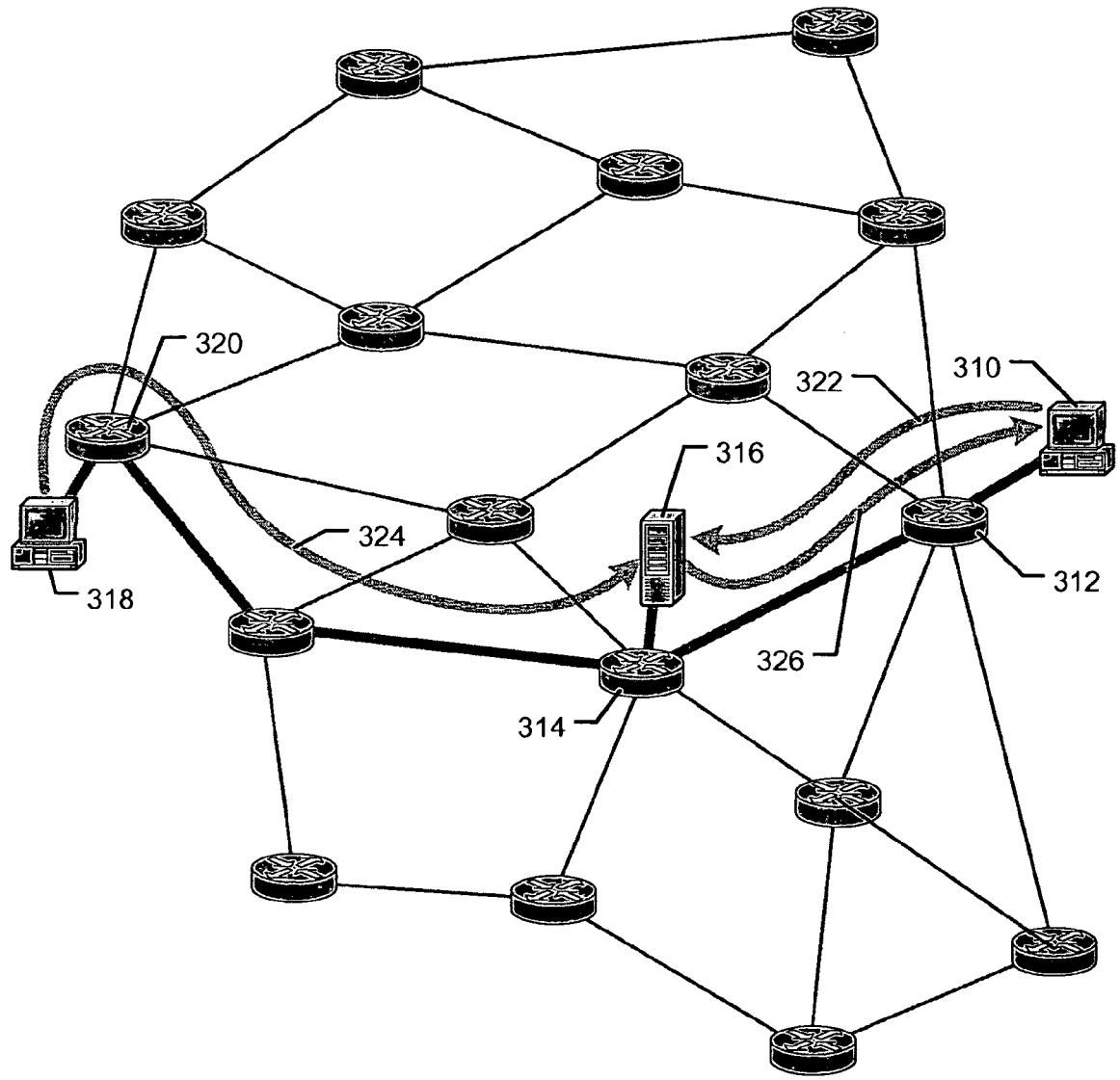
FIG. 10 illustrates an Internet Indirection Infrastructure, using rendezvous based communications in a unicast situation.
Figure 11:
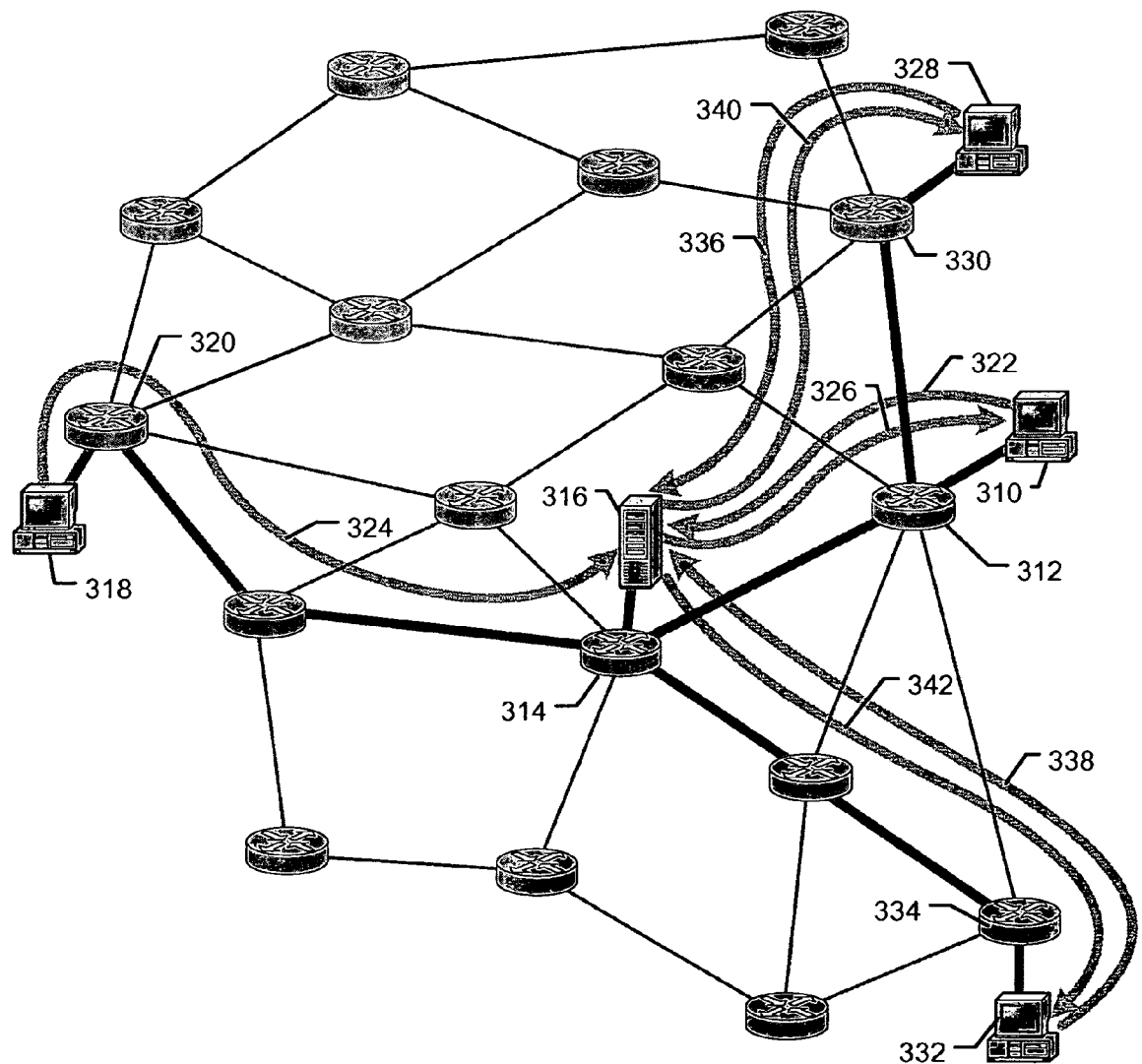
FIG. 11 illustrates an Internet Indirection Infrastructure, using rendezvous based communications in a multicast situation.
Figure 12:
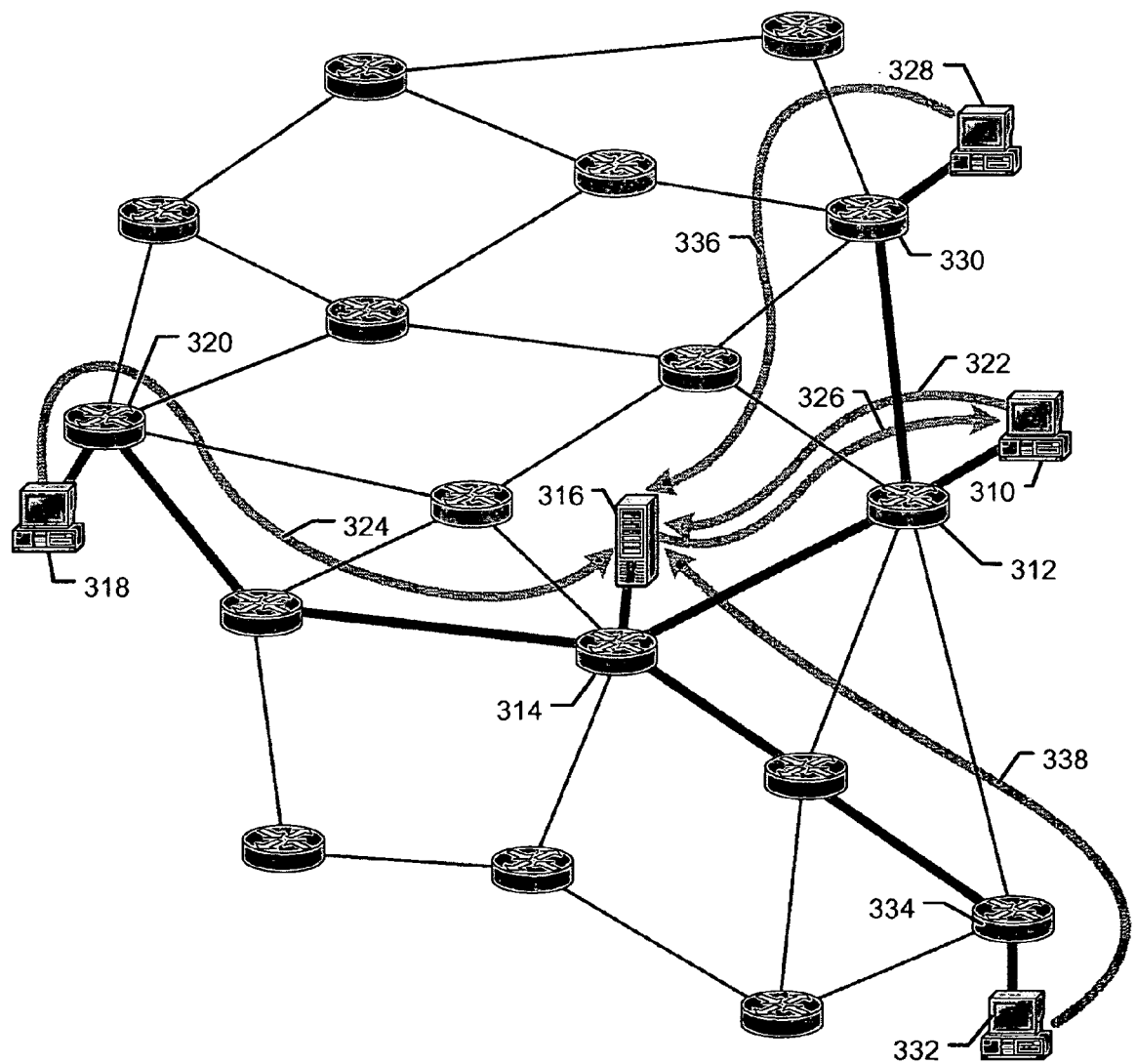
FIG. 12 illustrates an Internet Indirection Infrastructure, using rendezvous based communications in an anycast situation.
Figure 13:
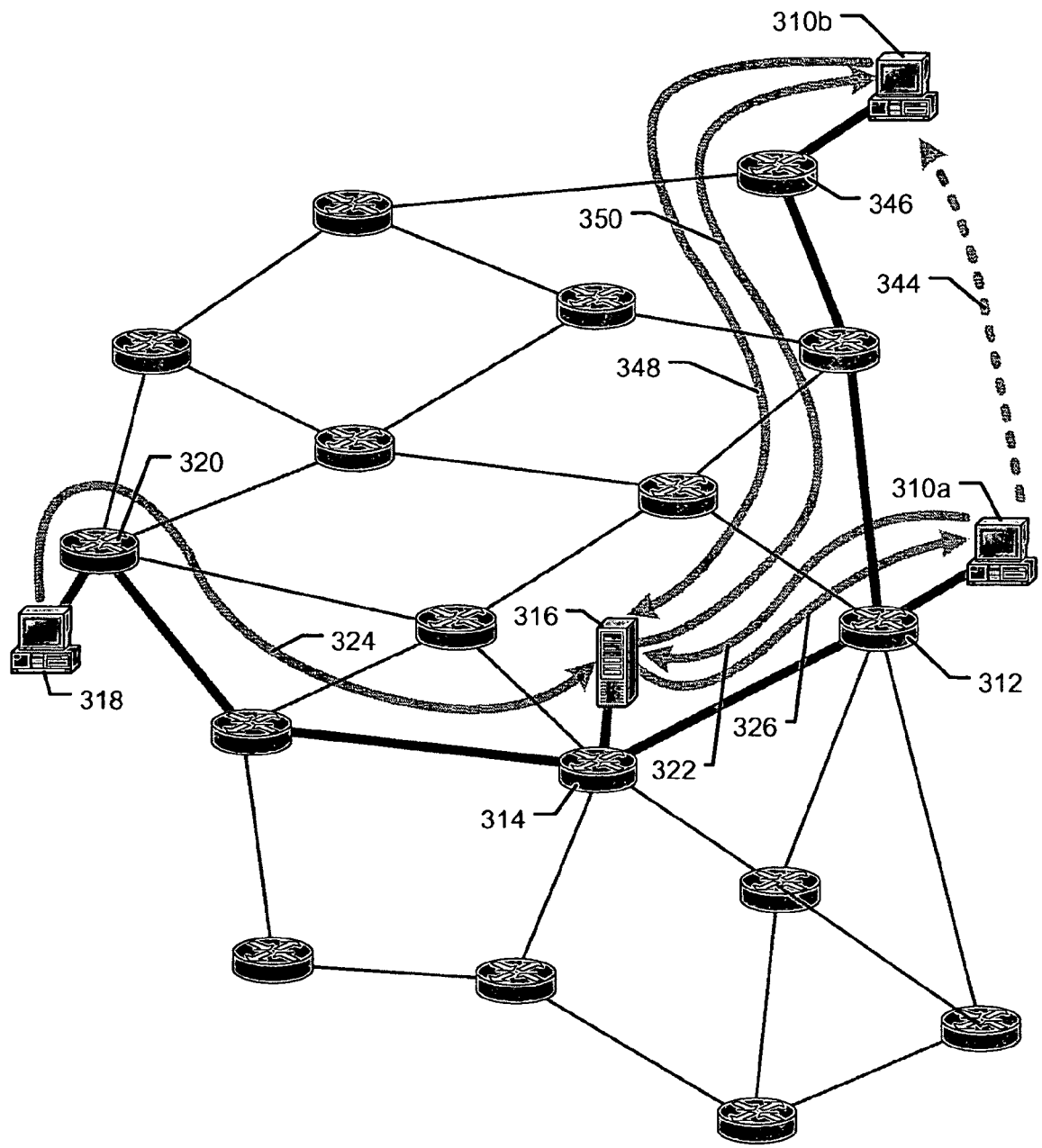
FIG. 13 illustrates an Internet Indirection Infrastructure, using rendezvous based communications in a mobile dynamic situation.
Figure 14:
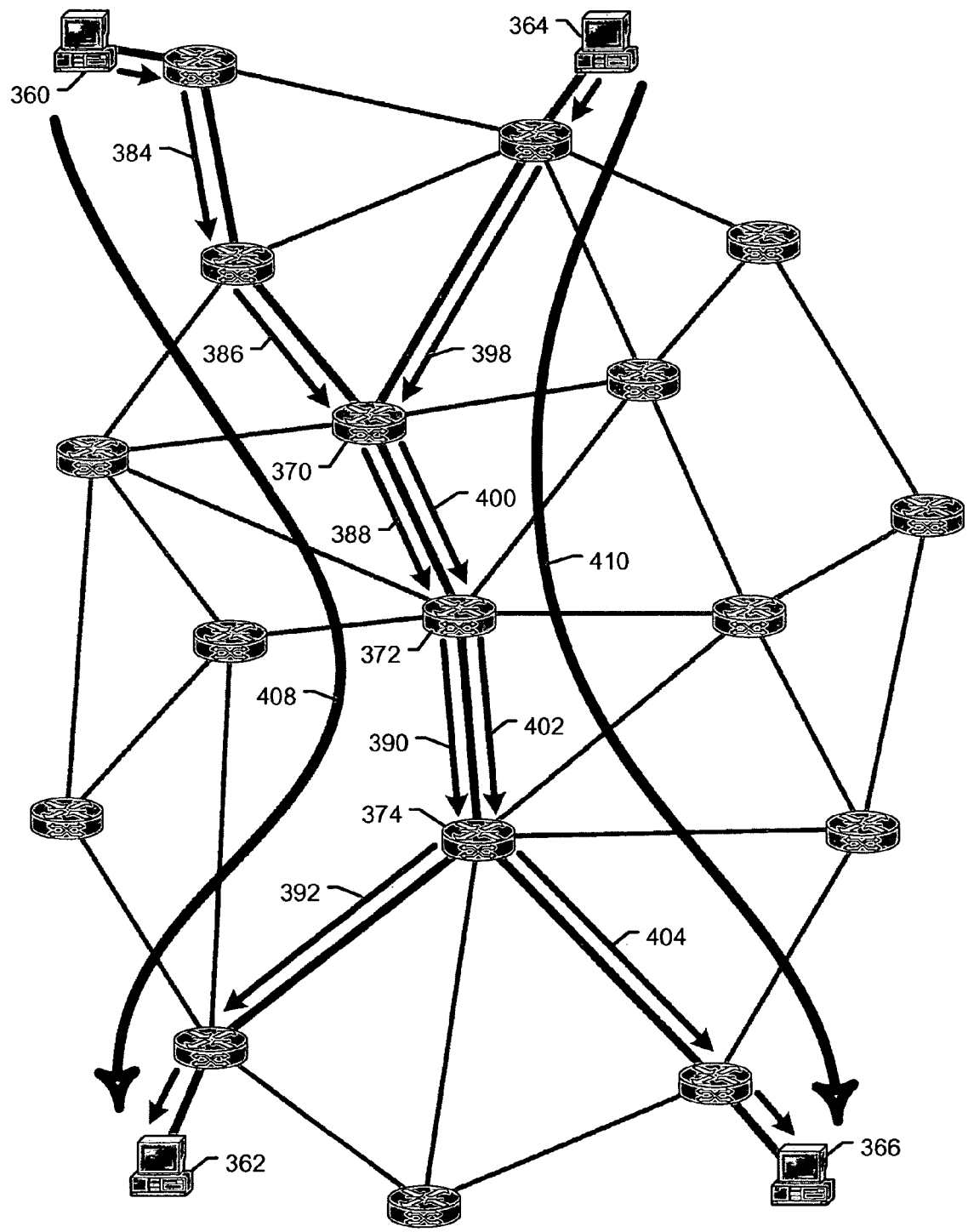
FIG. 14 illustrates a MPLS domain showing label merging or flow aggregation.
Figure 15:
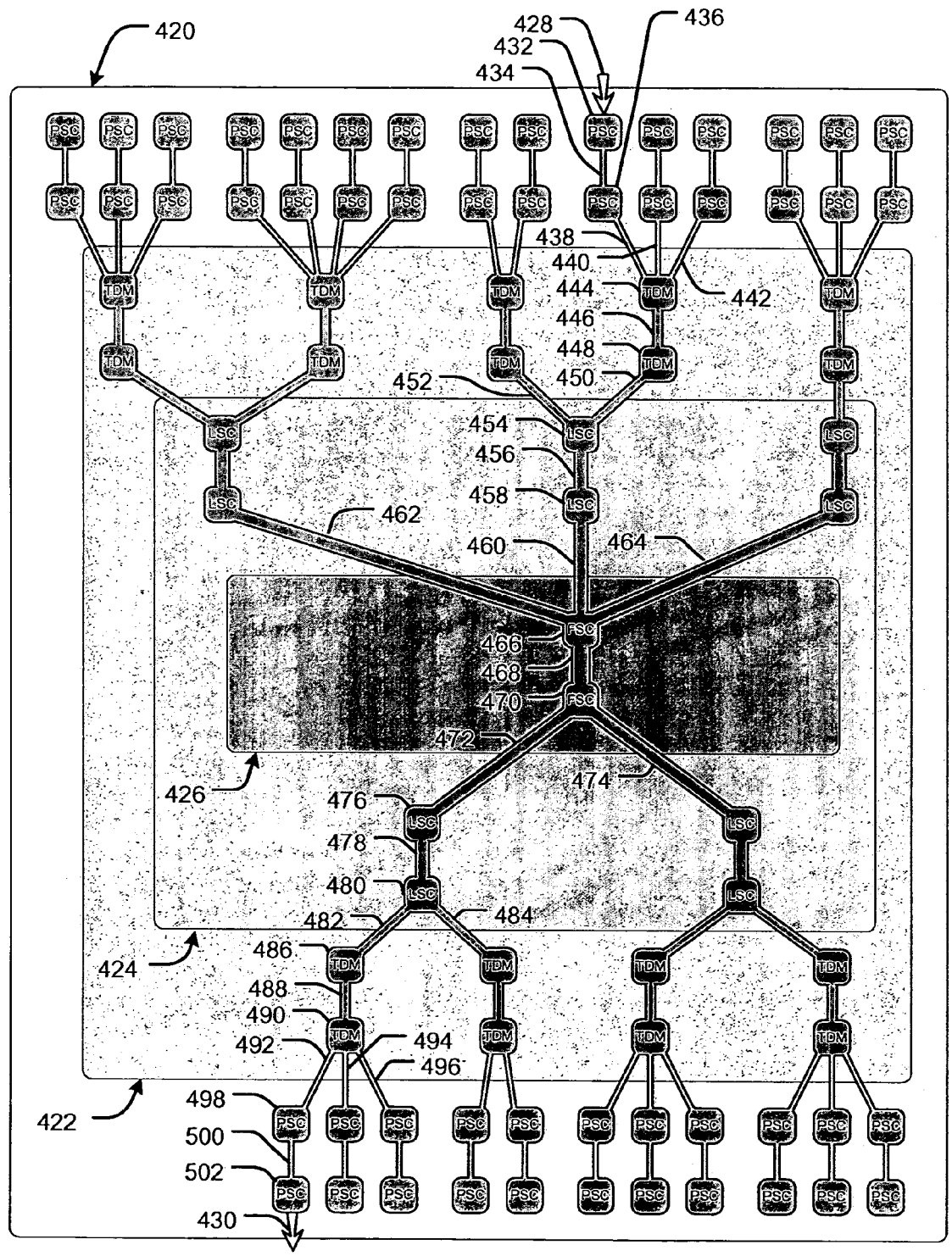
FIG. 15 illustrates a GMPLS domain showing hierarchical structure occurring in bandwidth or flow aggregation.
Figure 16:
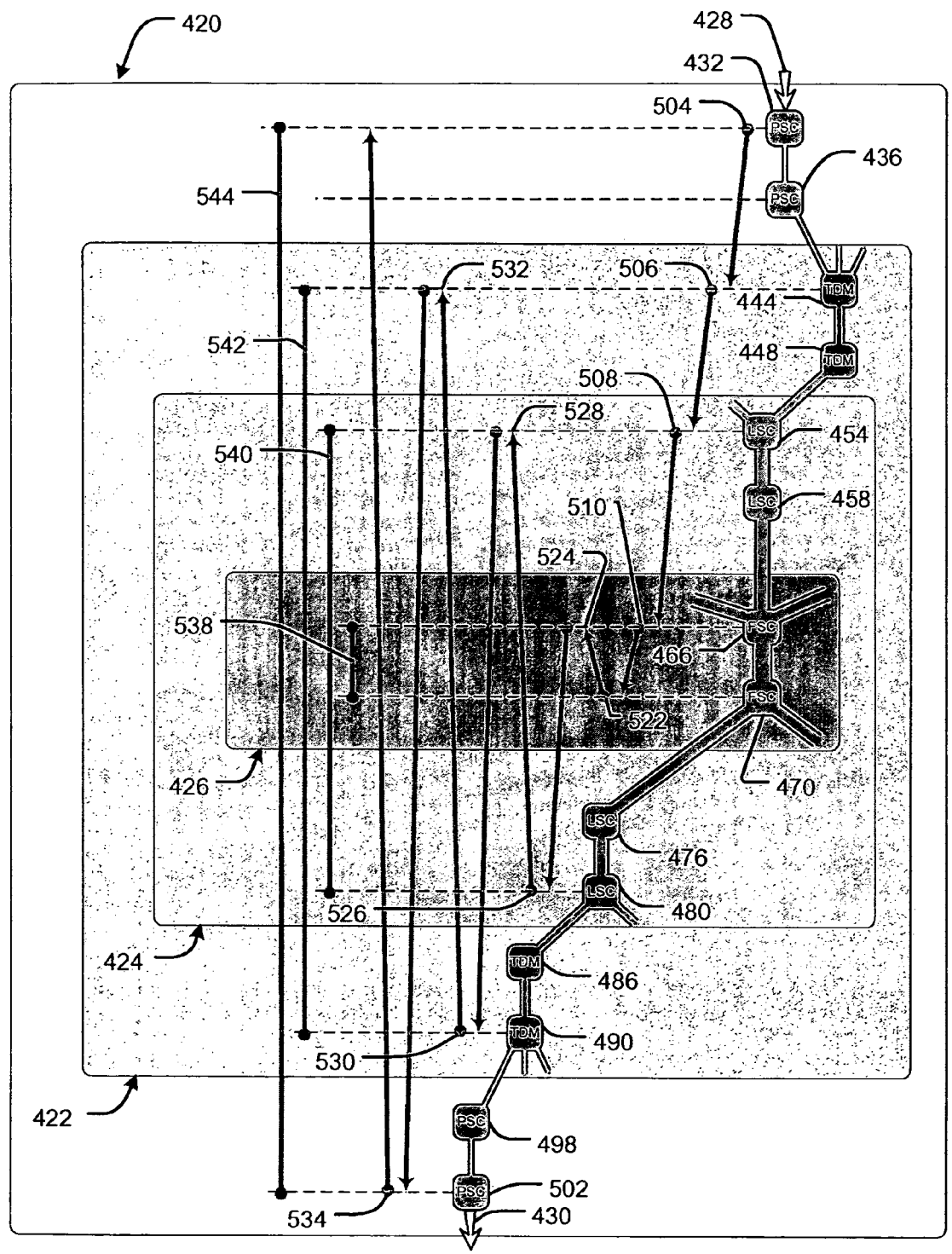
FIG. 16 illustrates a GMPLS domain showing the Hierarchal LSP creation process used in bandwidth or flow aggregation.
Figure 17:
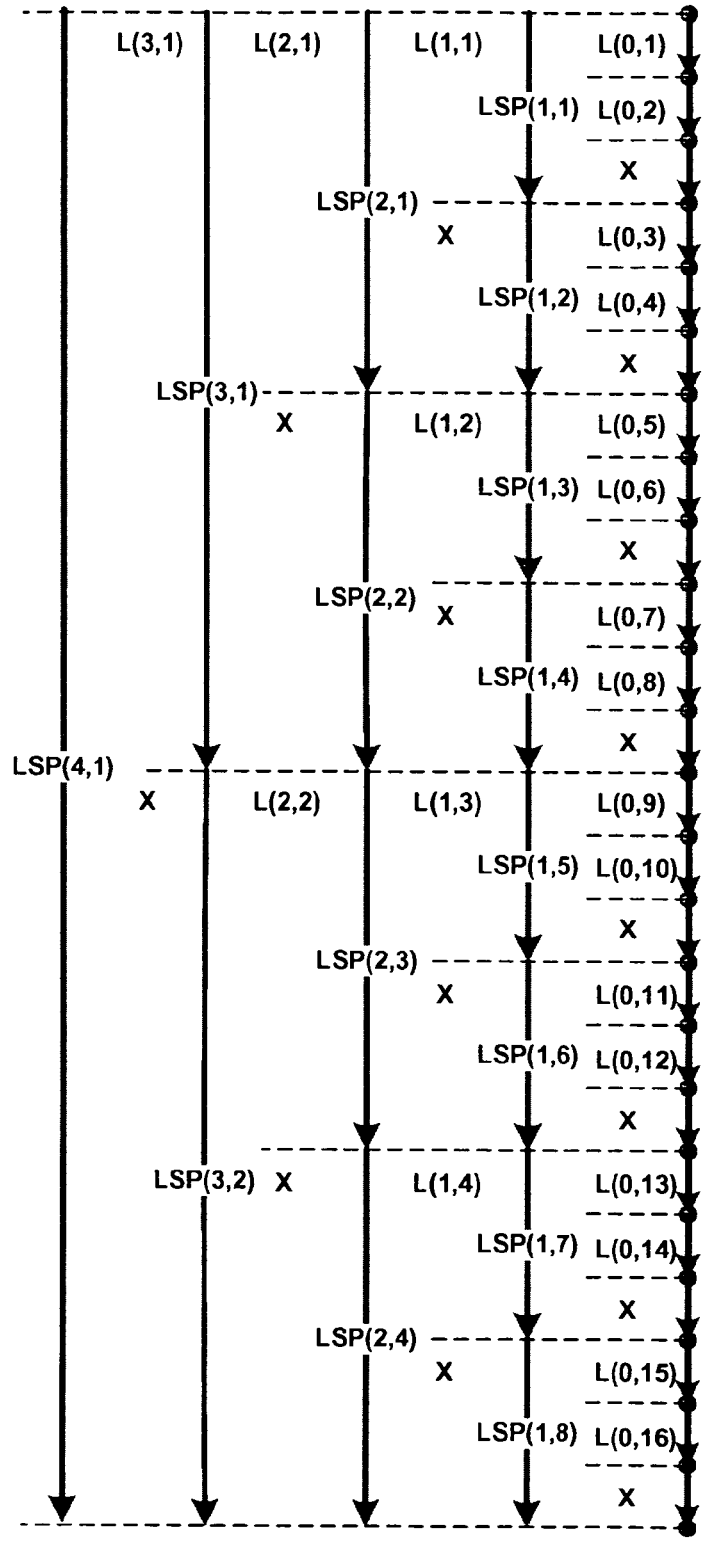
FIG. 17 illustrates label stacking for a homogeneous Hierarchical LSP sequence.
Figure 18:
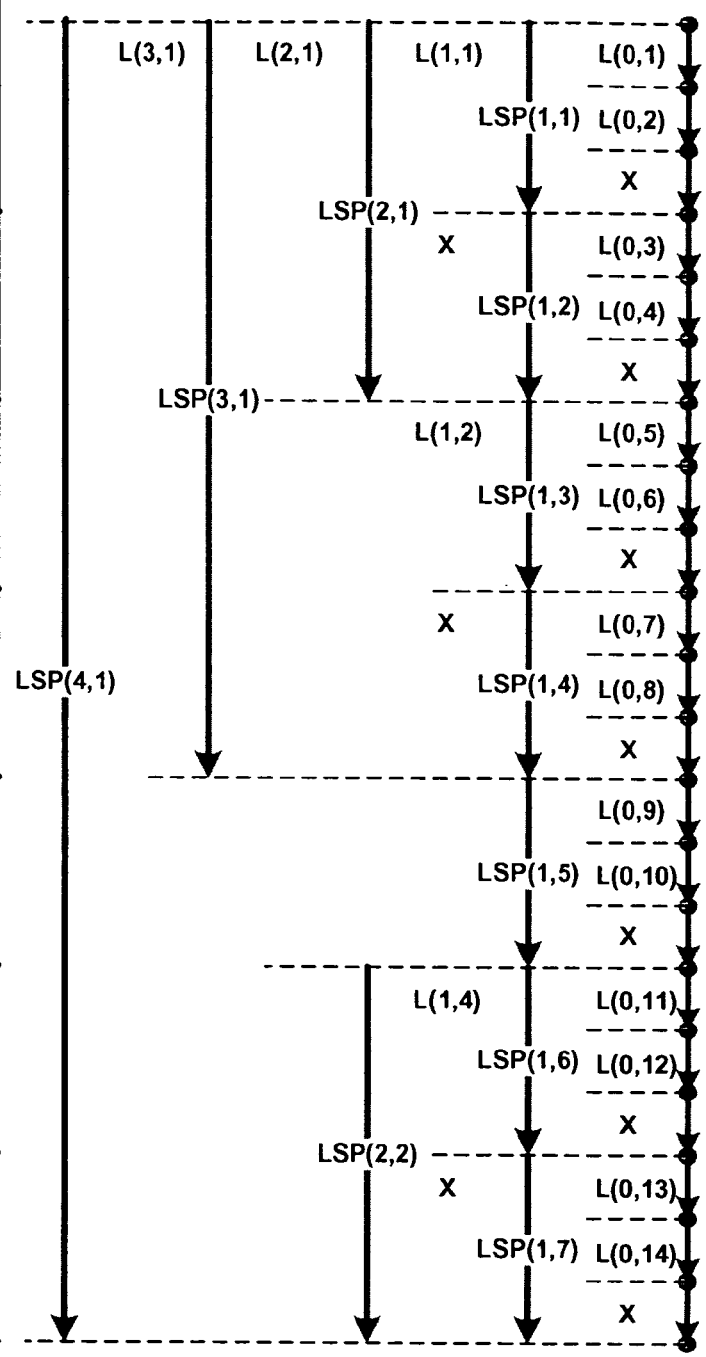
FIG. 18 illustrates label stacking for an inhomogeneous Hierarchical LSP sequence.
Figure 19:
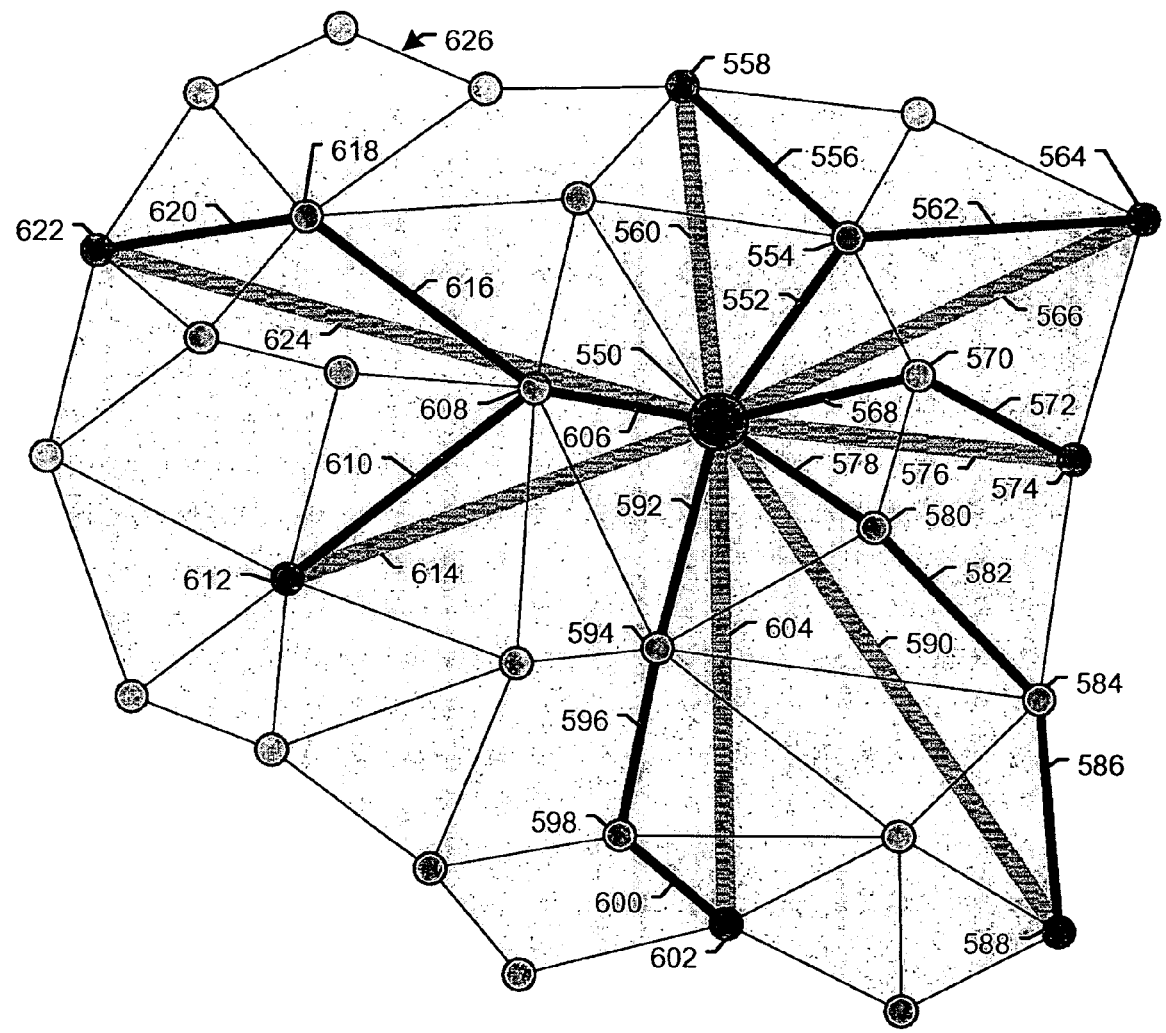
FIG. 19 illustrates contact mapping in a MPLS domain.

An illustrative portion of a MPLS domain is shown in FIG. 19. The MPL capable network 626 consists of interconnected Label Switching Routers (LSR). The CU of interest 550 is a source or destination node for the communication path to be determined. With a particular set of relational attributes, there exists a set of associate CUs exhibiting direct or first level contacts. In the subset of CUs illustrated, these are shown as nodes 558, 564, 574, 588, 602, 612 and 622. Each of these CUs are composed of a sequence of segments making up a first level H-LSP. Segments 552 and 556 create H-LSP 560 between 550, 554 and 558. Segments 552 and 662 create H-LSP 566 between 550, 554 and 564. Segments 568 and 572 create H-LSP 576 between 550, 570 and 574. Segments 578, 582 and 586 create H-LSP 590 between 550, 580, 584 and 588. Segments 592, 596 and 600 create H-LSP 604 between 550, 594, 598 and 602. Segments 706 and 610 create H-LSP 614 between 550, 594 and 602. Segments 606, 616 and 620 create H-LSP 624 between 550, 608, 618 and 622. This set of H-LSPss make up a first level contact domain for CU 550. This subset of a MPLS domain 626 is shown in a larger set of the MPLS in FIG. 20.

Figure 20:
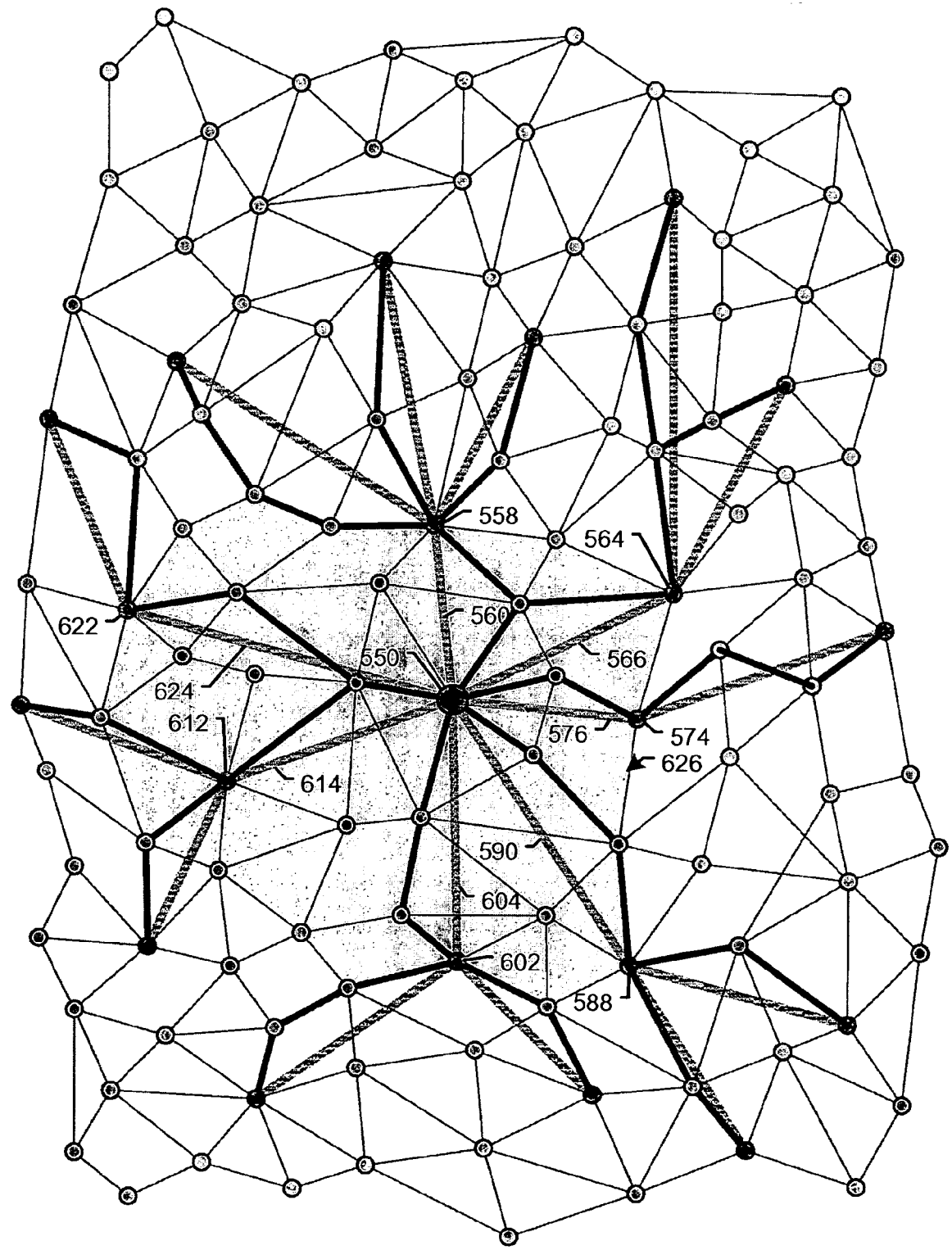
FIG. 20 illustrates extending contact mapping in a MPLS domain.
Figure 21:
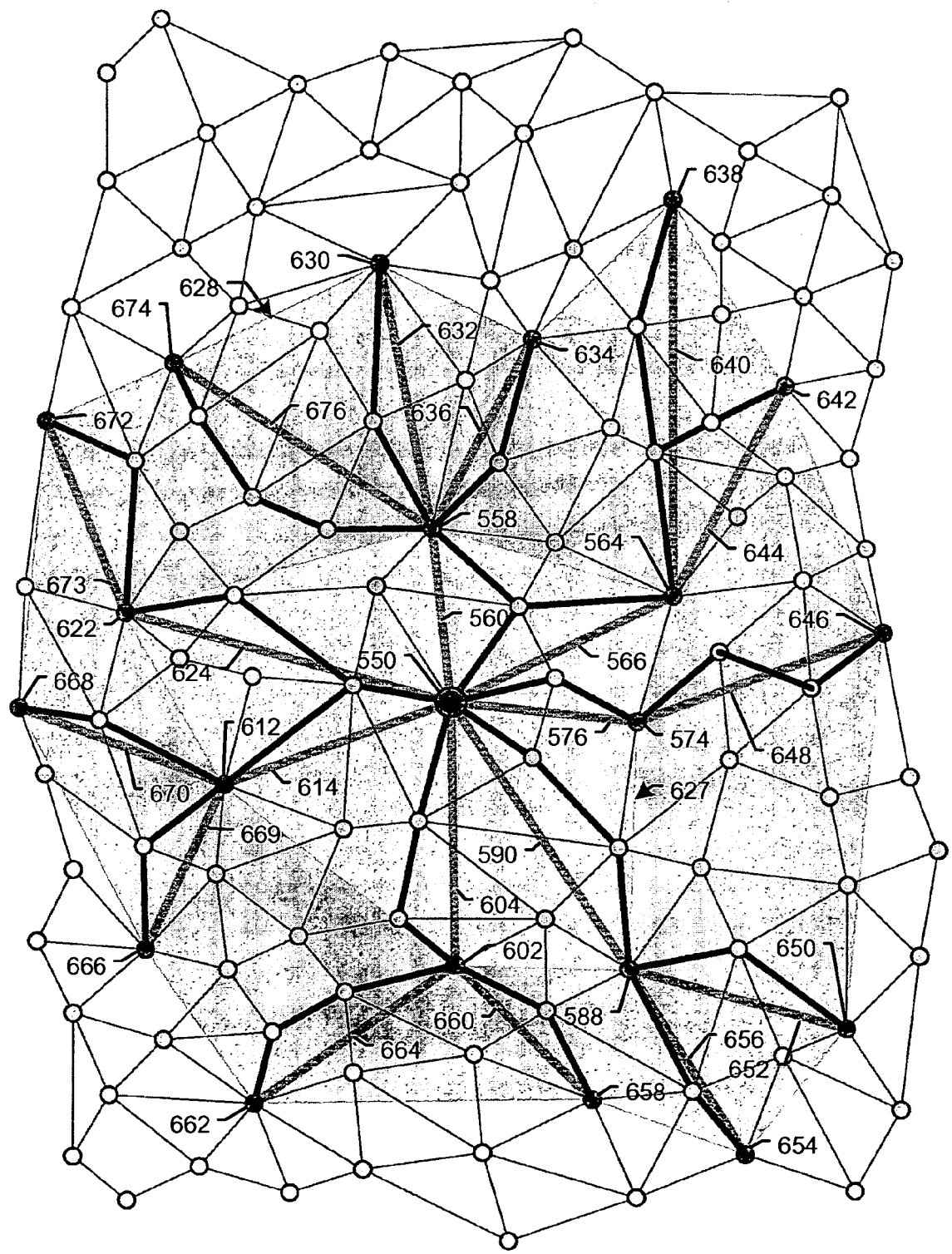
FIG. 21 illustrates extending contact mapping in a MPLS domain.

The first level contact domain of FIG. 19 can be extended. Each of the first level contacts can each have its own set of first level contacts, extending the contact domain for CU 550 as illustrated in FIG. 20. As shown in FIG. 21, the first level contact domain 627 is shown with the first level extensions of each of the first level contact CUs 558, 564, 574, 588, 602, 612 and 622. CU 558 is extended to its first level contacts 674 (with H-LSP 676), j 90 (with H-LSP 632) and 634 (with H-LSP 636). CU 558 is extended to its first level contacts 674 (with H-LSP 676), j 90 (with H-LSP 632) and 634 (with H-LSP 636). CU 558 is extended to its first level contacts 674 (with H-LSP 676), j 90 (with H-LSP 632) and 634 (with H-LSP 636). CU 558 is extended to its first level contacts 674 (with H-LSP 676), j 90 (with H-LSP 632) and 634 (with H-LSP 636). CU 564 is extended to its first level contacts 638 (with H-LSP 640) and 642 (with H-LSP 644). CU 574 is extended to its first level contact 646 (with H-LSP 648). CU 588 is extended to its first level contacts 651 (with H-LSP 652) and 654 (with H-LSP 656). CU 602 is extended to its first level contacts 658 (with H-LSP 660) and 662 (with H-LSP 664). CU 612 is extended to its first level contacts 666 (with H-LSP 669) and 668 (with H-LSP 670). CU 622 is extended to its first level contact 672 (with H-LSP 673). This extends the contact domain to 628.

Figure 22:
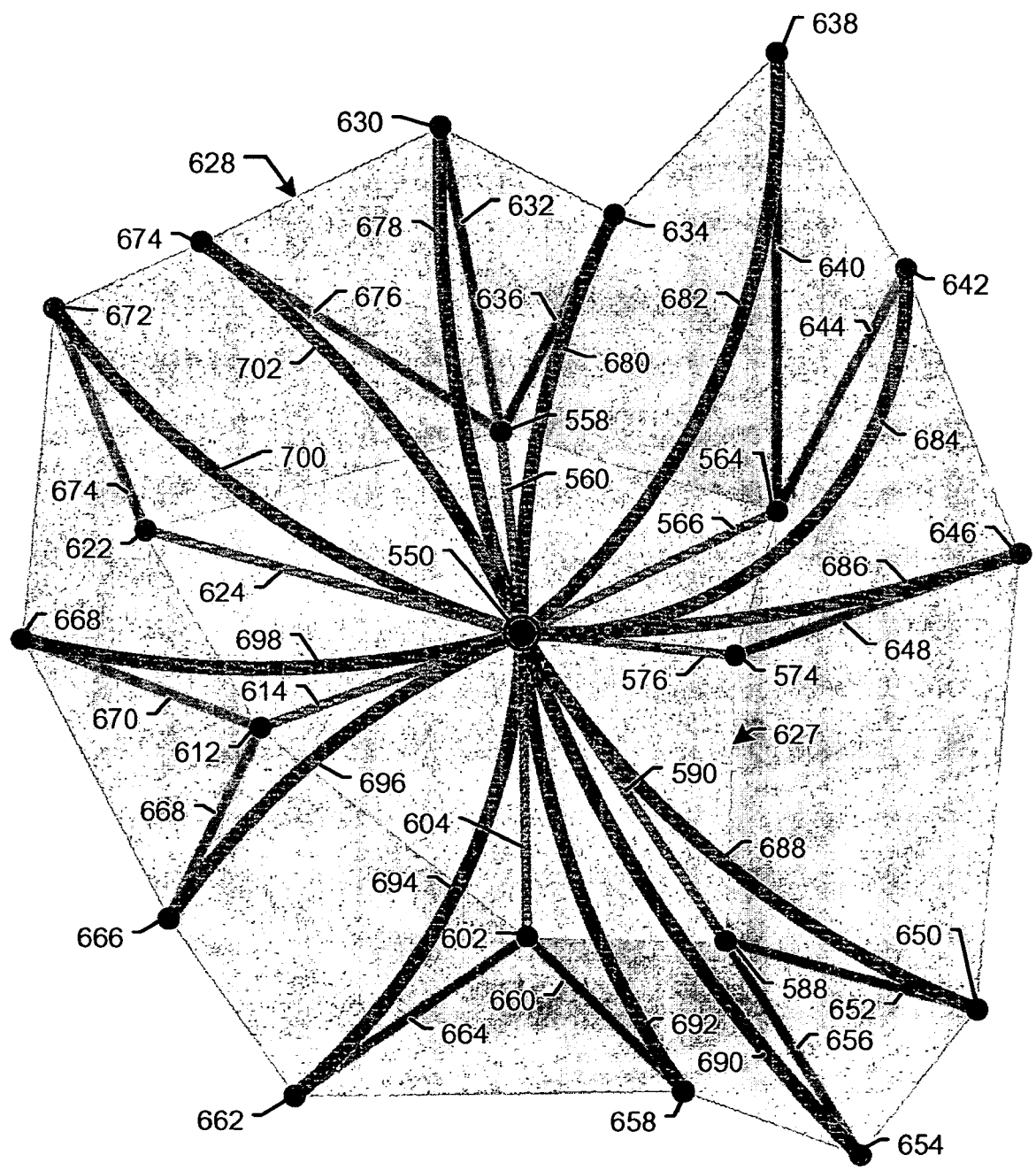
FIG. 22 illustrates contact hierarchy in a MPLS domain.
Figure 23:
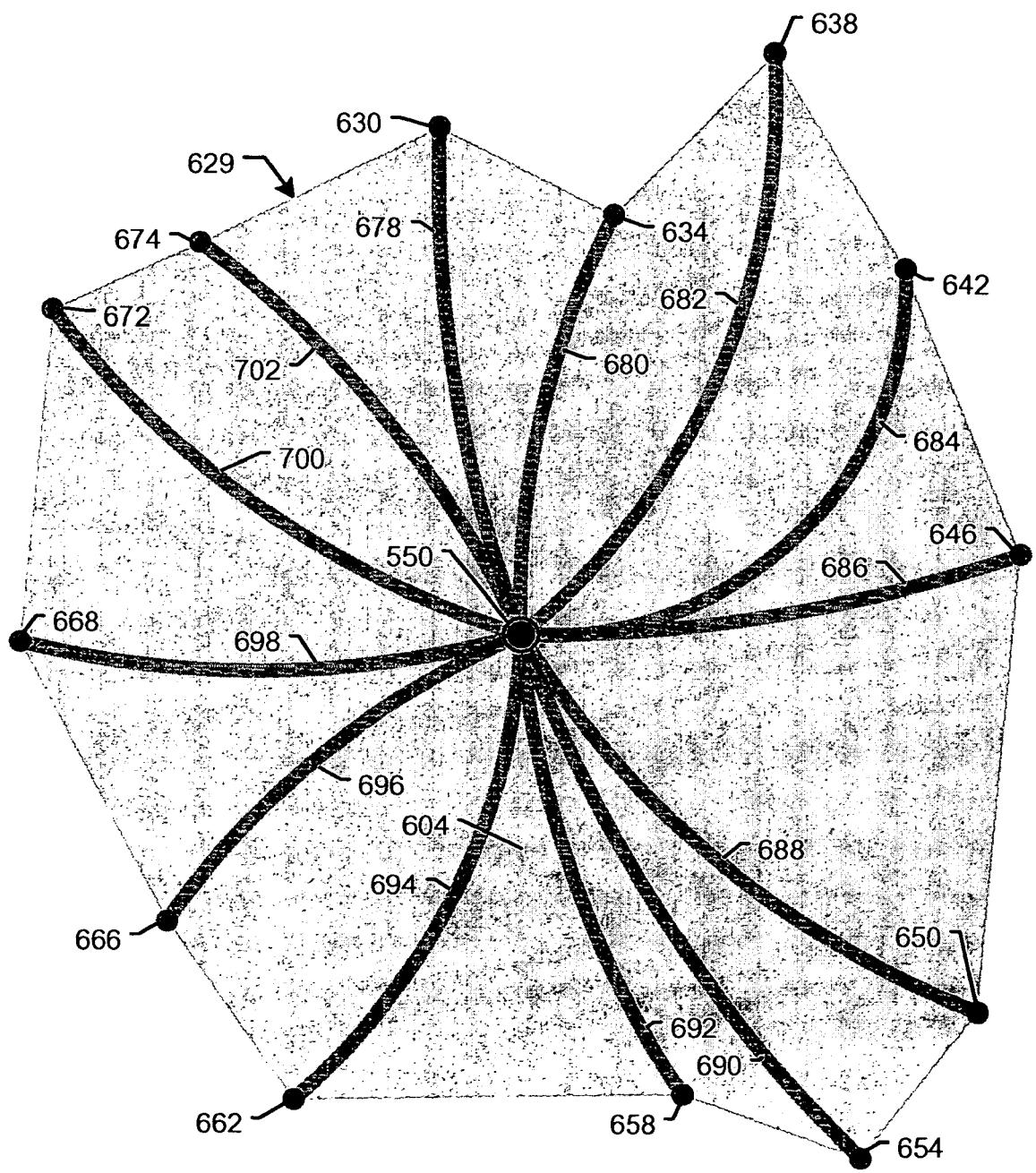
FIG. 23 illustrates a level 2 contact domain.

Contact domain 628 is shown in FIG. 22 with the irrelevant MPLS components not shown for clarity. All first level contact H-LSPss are shown for domains 627 as well as the extended domain 628. The first level H-LSPs can be concatenated to create a second level contact domain which is identical in scope with the combined first level domains 627 and 628. First level H-LSPs 560 and 632 are concatenated to form H-LSP 678. First level H-LSPs 560 and 636 are concatenated to form H-LSP 680. First level H-LSPs 566 and 640 are concatenated to form H-LSP 682. First level H-LSPs 566 and 644 are concatenated to form H-LSP 684. First level H-LSPs 576 and 648 are concatenated to form H-LSP 686. First level H-LSPs 590 and 652 are concatenated to form H-LSP 688. First level H-LSPs 590 and 656 are concatenated to form H-LSP 690. First level H-LSPs 604 and 660 are concatenated to form H-LSP 692. First level H-LSPs 604 and 664 are concatenated to form H-LSP 694. First level H-LSPs 614 and 668 are concatenated to form H-LSP 696. First level H-LSPs 614 and 670 are concatenated to form H-LSP 698. First level H-LSPs 624 and 674 are concatenated to form H-LSP 700. First level H-LSPs 560 and 676 are concatenated to form H-LSP 702. The resulting second level contact domain 629 for CU 550 is shown in FIG. 23.

Figure 24:
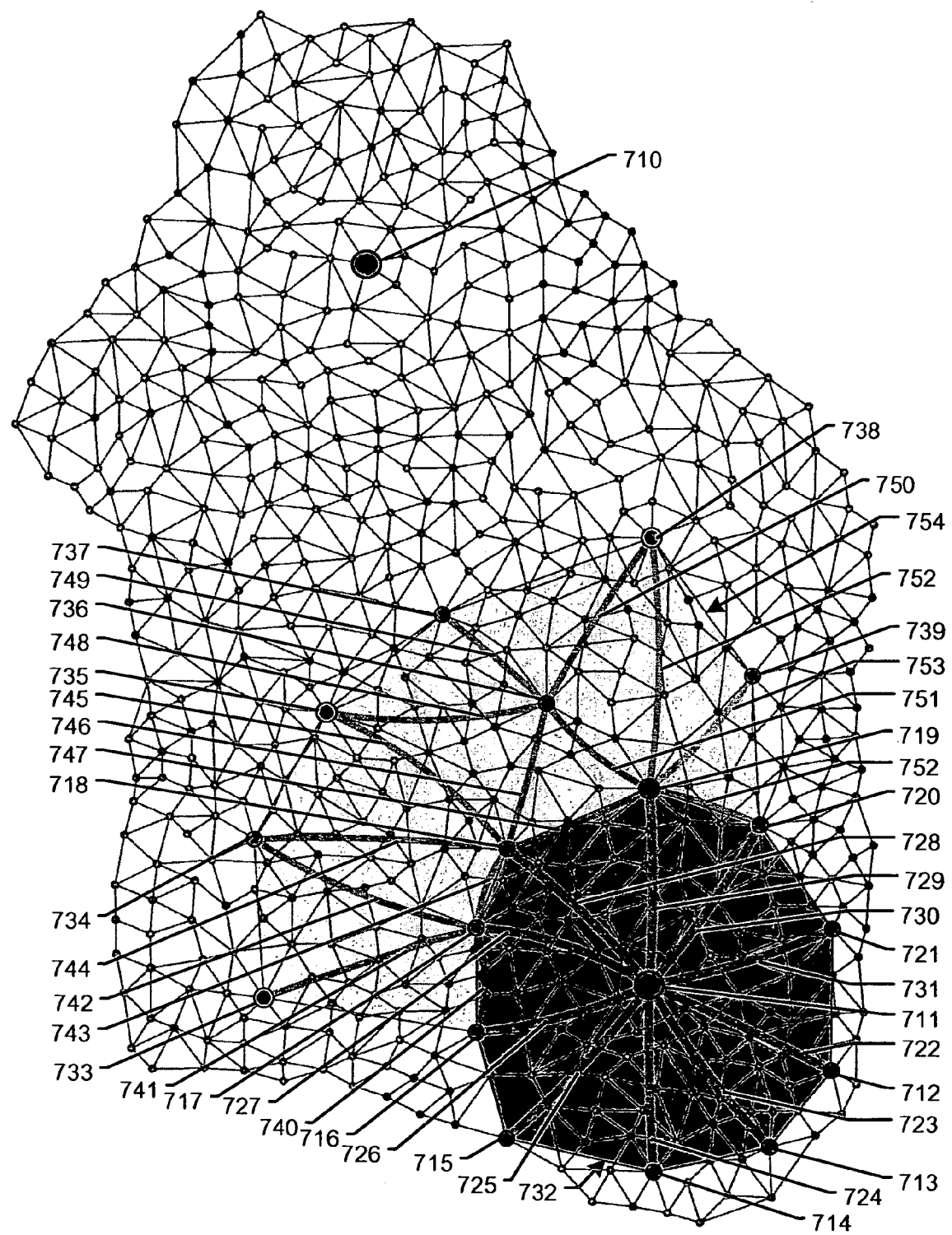
FIG. 24 illustrates Small World Infrastructure rendezvous based communications from receiver to rendezvous point for indirection service.

The SWI service model is simple. For indirection services, the sender maps an identifier to a packet forwarding path from the sender to the rendezvous point, where the receiver expresses interest in packets sent to the same identifier. In FIG. 24 is shown a larger MPLS domain which includes a source or sender CU, 710 and a destination or receiver CU, 711. For an indirection service, the sender 711 would need to locate rendezvous point(s) suited to the service relational attributes. The initial contact domain 732 for the receiver 711 consists of contacts 712, 713, 714, 715, 716, 717, 718, 719, 720 and 722 which are connected with H-LSPs 722, 723, 724, 725, 726, 727, 728, 729, 730 and 731, respectively. From within these contacts, 717, 718 and 719 are found to have attributes and contact extensions with the best relational attributes for the requested service. Contact 718 has a contact domain that extends to contacts 716, 733, 734 and 718 connected with H-LSPs 740, 741, 742 and 743, respectively. Contact 719 has a contact domain that extends to contacts 717, 734, 735, 736 and 719 connected with H-LSPs 743, 744, 745, 746 and 747, respectively. Contact 719 has a contact domain that extends to contacts 718, 736, 738, 739 and 720 connected with H-LSPs 747, 751, 752, 753 and 752, respectively. Contact 736 has a contact domain that extends to contacts 718, 735, 737, 738 and 719 connected with H-LSPs 746, 748, 749, 750 and 751, respectively. The contact domain for CU 711 has been extended by the domain 754.

Figure 25:
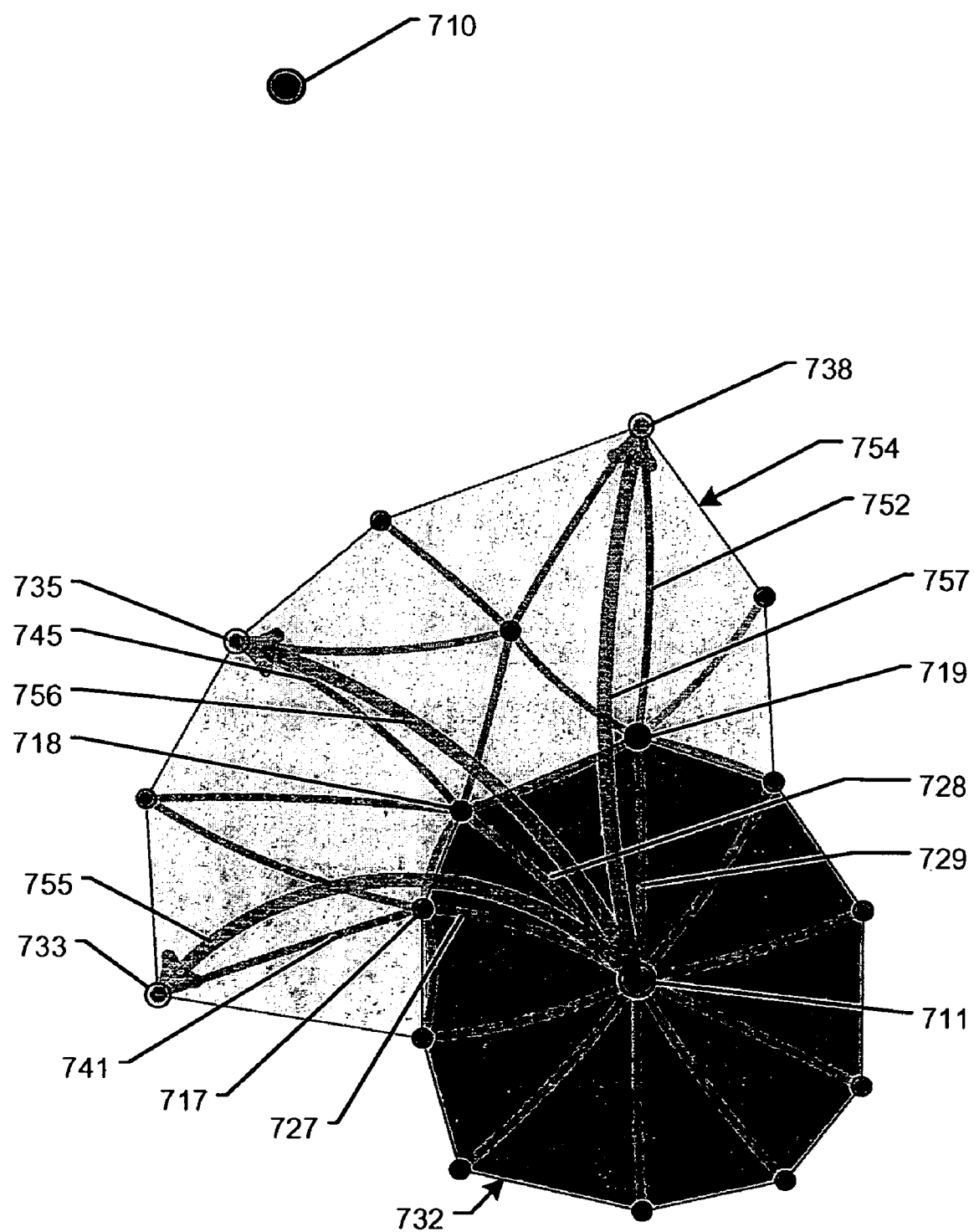
FIG. 25 illustrates Small World Infrastructure triggers for indirection service.

The contact domain 732 and the extended domain 754 are illustrated in FIG. 25 with MPLS components not shown for clarity. For this specific example, contacts 733, 735 and 738 are determined to have the best relational attributes for use as rendezvous points for the service. The rendezvous point 733 would have a trigger sent from the receiver 711 containing the identifier ID and forwarding path from the rendezvous point 733 to the receiver 711. This forwarding path would be H-LSP 755 composed from the lower level H-LSPs 741 and 727. The rendezvous point 734 would have a trigger sent from the receiver 711 containing the identifier ID and forwarding path from the rendezvous point 734 to the receiver 711. This forwarding path would be H-LSP 756 composed from the lower level H-LSPs 745 and 728. The rendezvous point 738 would have a trigger sent from the receiver 711 containing the identifier ID and forwarding path from the rendezvous point 738 to the receiver 711, This forwarding path would be H-LSP 757 composed from the lower level H-LSPs 752 and 729.

Figure 26:
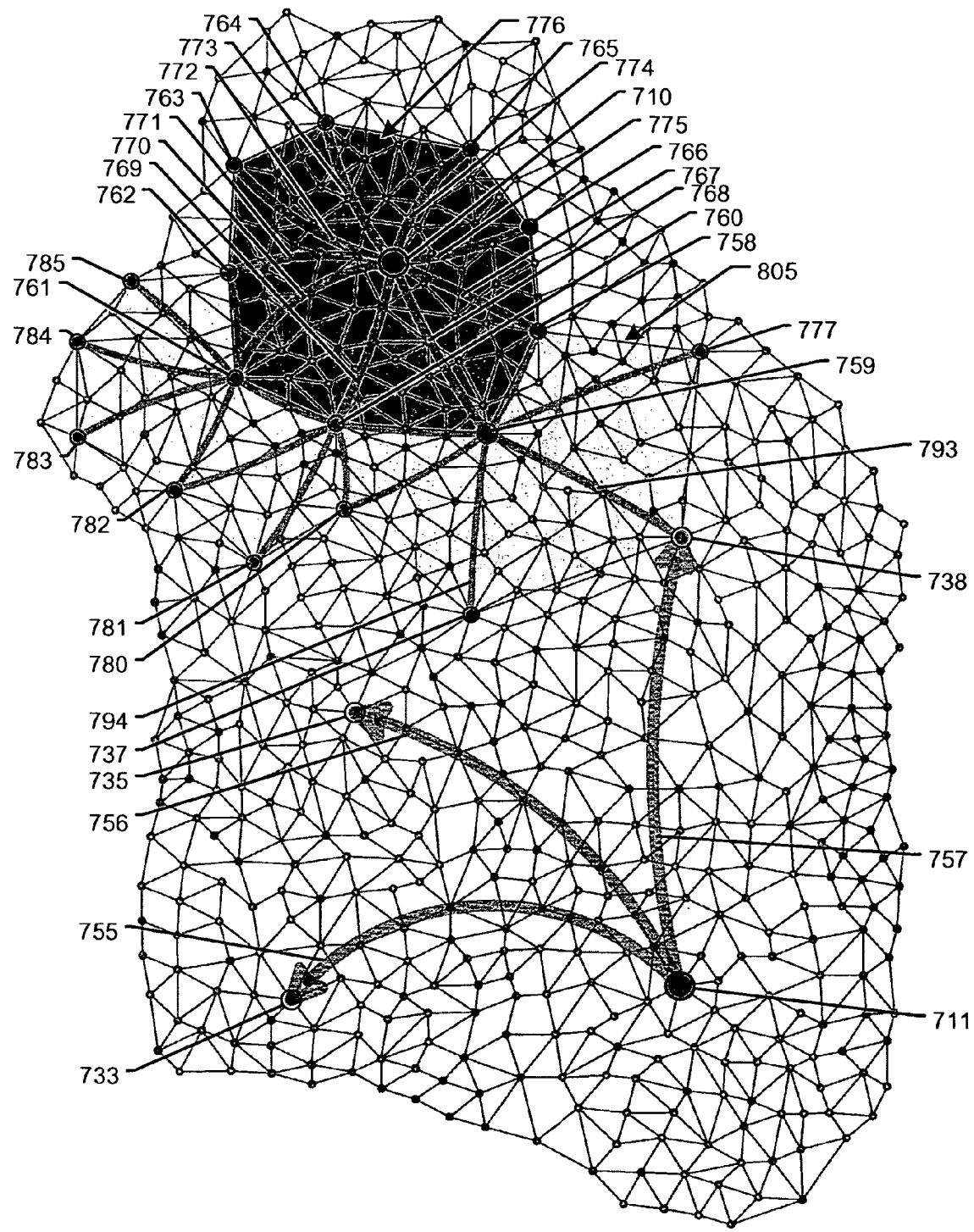
FIG. 26 illustrates Small World Infrastructure rendezvous based communications from sender to rendezvous point for indirection service.

At this point the receiver has inserted triggers at rendezvous points in the SWI awaiting services mapped to the identifier ID in the trigger, In FIG. 26 the MPLS domain is shown with the receiver 711 and the rendezvous points 733, 735 and 738 determined for trigger placement for the desired service. The sender 710 would attempt to map an identifier for the desired service identifier ID associated with the trigger placed by the receiver to a packet forwarding path from the sender to the rendezvous point. The sender only needs to locate a rendezvous point that is aware of the identifier ID associated with the trigger from the receiver. In the SWI service model, the process of finding a rendezvous point is very similar to the process of the receiver determining a rendezvous point for trigger placement. The sender 710 provides a service that is associated with the identifier ID requested by a receiver without any required prior knowledge of the receiver; only what service is required by the requested ID. The sender would have a contact domain 776 associated with the relational attributes of the service. The initial contacts 758, 759, 760, 761, 762, 763, 764, 765 and 766 would be connected with H-LSPs 767, 768, 769, 770, 771, 772, 773, 774 and 775, respectively. In a similar way that the contact domain is extended for the receiver, the sender's contact domain would determine that contacts 759, 760 and 761 would be best associated for extension. These contacts would extend the contact region to include contacts 777, 738, 737, 780, 781, 782, 783, 784 and 785.

Figure 27:
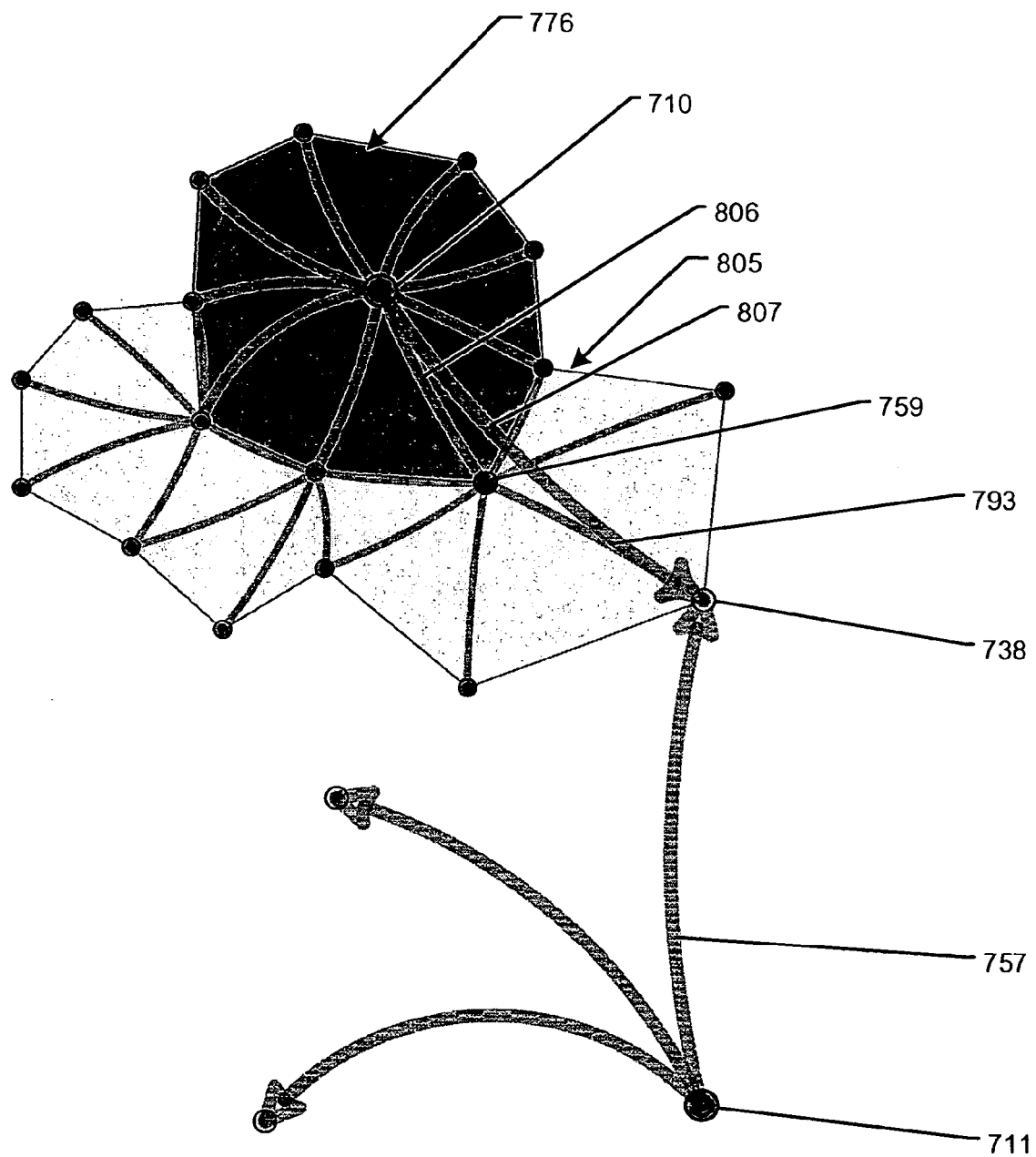
FIG. 27 illustrates Small World Infrastructure identifier lookup for indirection service.
Figure 28:
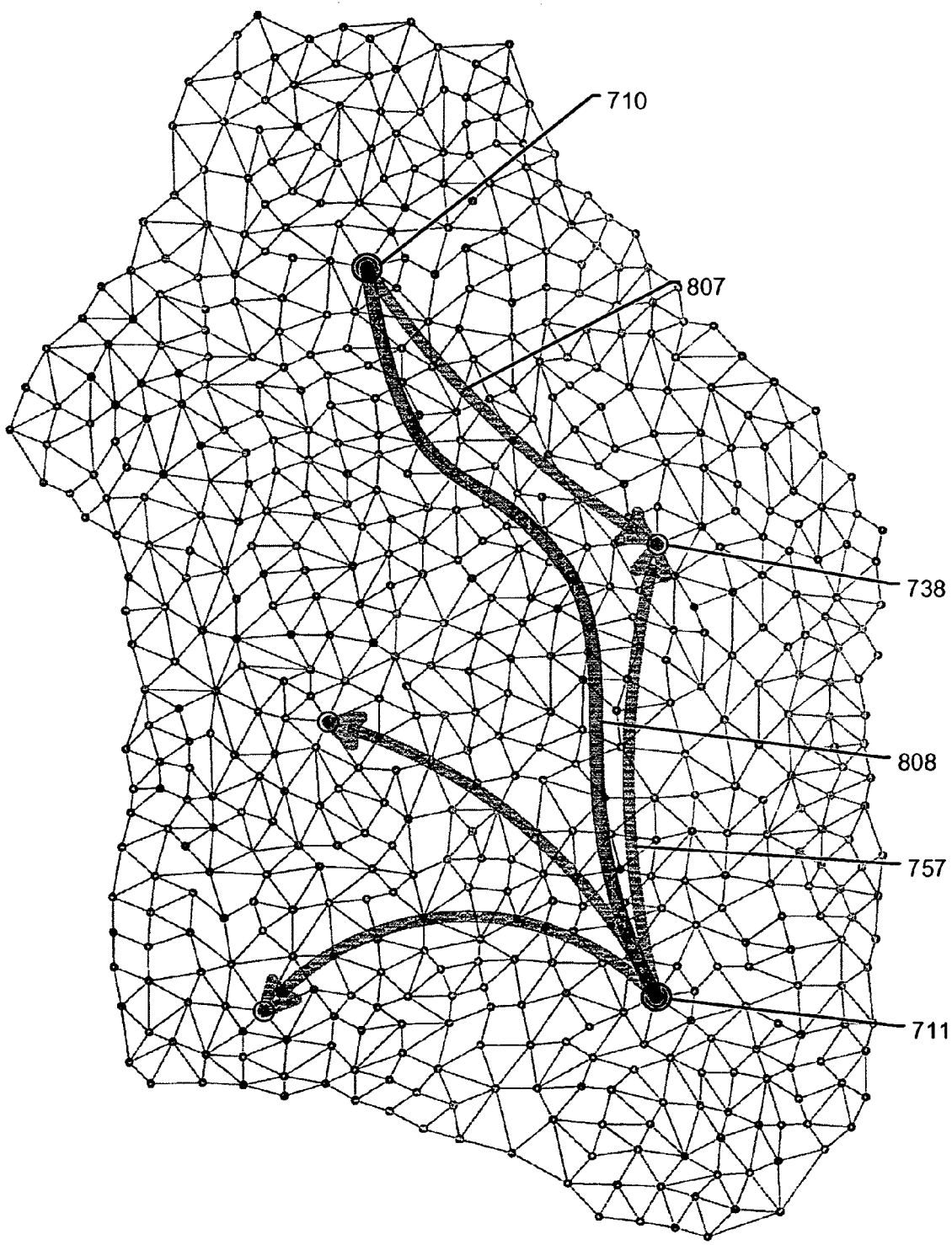
FIG. 28 illustrates Small World Infrastructure rendezvous based communications from sender to receiver for indirection service.

The resulting extended contact domain 805 is shown in FIG. 27 with the MPLS components not shown for clarity. The extended domain includes the rendezvous point 738 which is aware of the service identifier ID from the receiver 711. The sender 710 would map an identifier for the desired service identifier ID associated with the trigger placed by the receiver to a packet forwarding path from the sender to the rendezvous point. This forwarding path would be H-LSP 807 composed from the lower level H-LSPs 806 and 793. The forwarding path from the sender to the receiver would be complete and the rendezvous point would concatenate the sender H-LSP and the receiver H-LSP resulting in the H-LSP 808 shown in FIG. 28. The sender can now use the forwarding path to send the appropriate service packets to the receiver. This is the simple case of a unicast indirection service.

Figure 29:
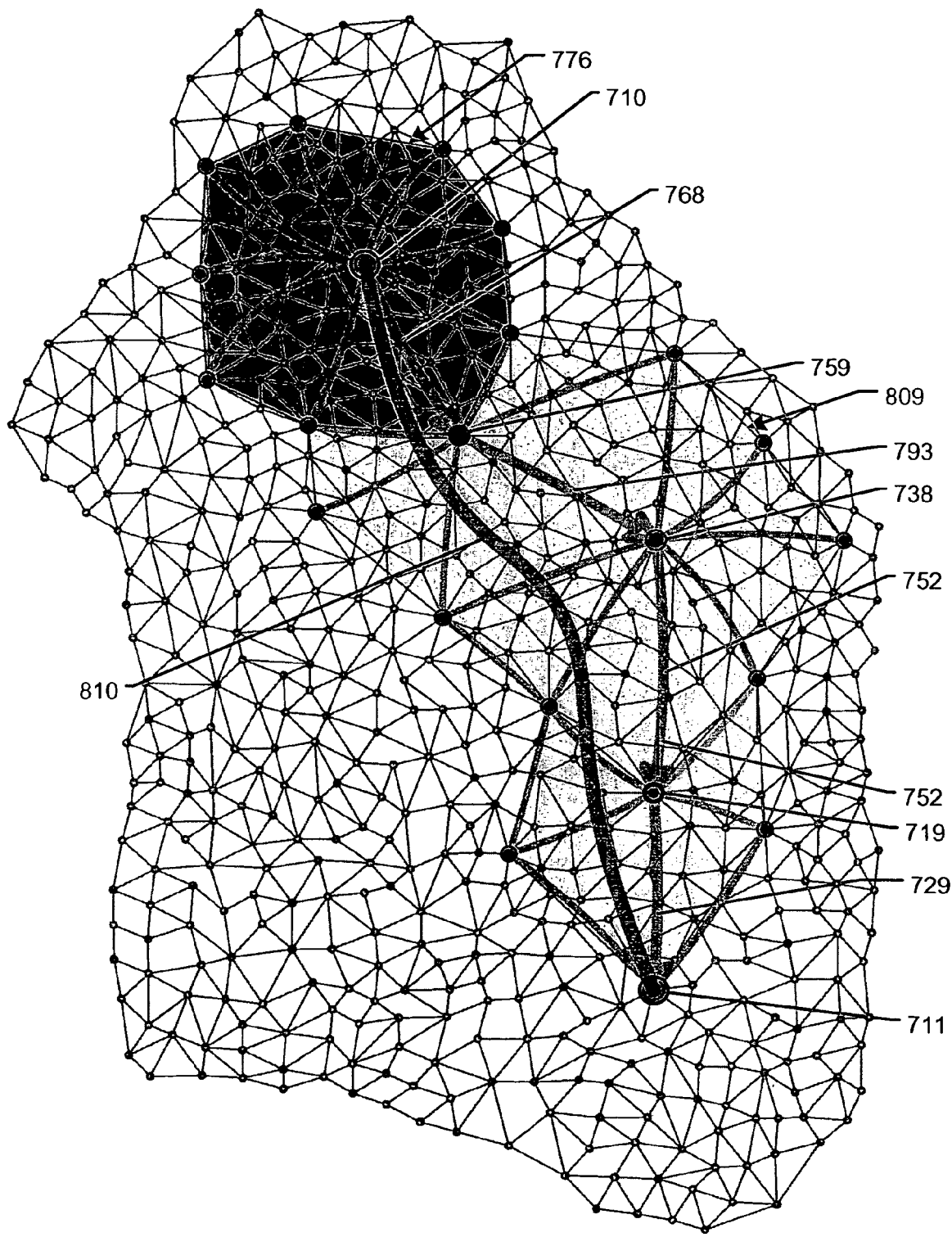
FIG. 29 illustrates Small World Infrastructure rendezvous based communications from sender to receiver for direction service.

For a direction service, the receiver 711 would be the rendezvous point. This is shown in FIG. 29 with the sender 710 providing the direction service. The trigger would be located at the rendezvous point which is the receiver 711 and contain the identifier ID of the service and the address of the receiver. Identically as in the indirection service scenario the sender only needs to locate a rendezvous point that is aware of the identifier ID associated with the trigger from the receiver. The sender 710 provides a service that is associated with the identifier ID requested by a receiver without any required prior knowledge of the receiver; only what service is required by the requested identifier ID. The sender would have a contact domain 776 associated with the relational attributes of the service. The contact domain is extended for the sender in a series of extensions contact by contact through 759, 738 and 719. The extended contact region 809 includes the rendezvous point or receiver 711 which is aware of the service identifier ID. The sender 710 would map an identifier for the desired service identifier ID associated with the trigger placed by the receiver to a packet forwarding path from the sender to the rendezvous point. This forwarding path would be H-LSP 810 composed from the lower level H-LSPs 768, 793, 752 and 729. The forwarding path 810 from the sender to the receiver would be used by the sender for forwarding the appropriate service packets to the receiver. This is the simple case of a unicast direction service.

The SWI service model supports many different indirection and direction scenarios. All of them utilize the concept of relational contacts for location services. The remainder of the illustrations utilizing the SWI service model will use these relational contacts for locating rendezvous points in a similar method as the previous illustrations. These show the versatility of the SWI service model.

Figure 30:
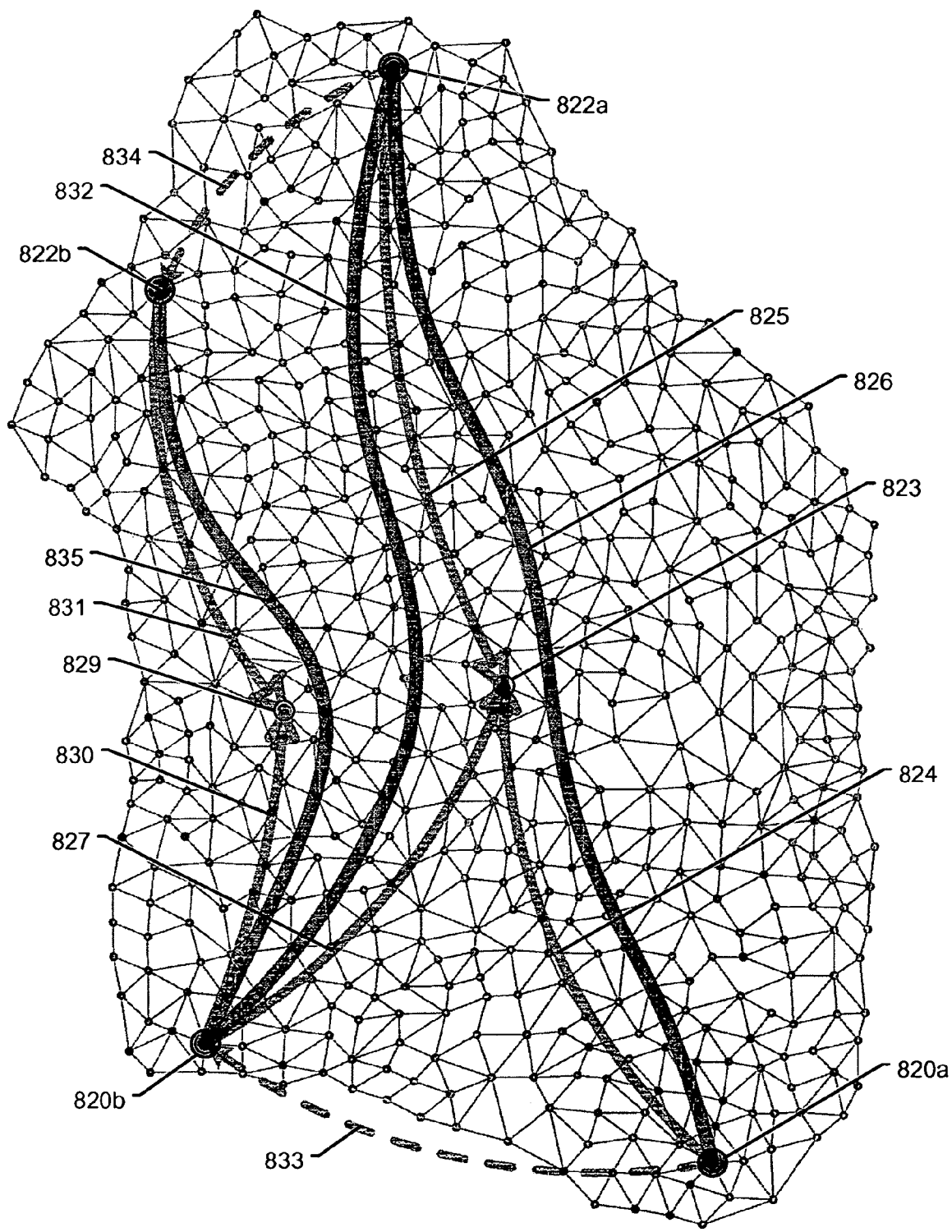
FIG. 30 illustrates Small World Infrastructure rendezvous based communications from sender to receiver for a mobile indirection service.

Mobility is illustrated in FIG. 30 with mobile sender and receiver with an indirection service. The SWI service model accommodates mobility independent of sender or receiver mobility. The receiver only needs to have knowledge of a rendezvous point and keep the trigger up to date with its location. Since the sender would map an identifier ID to a forwarding path based on the H-LSP to the rendezvous point, no additional operation needs to be invoked when the sender moves. The FIG. 30 will be used to discuss several situations. A simple case with stationary sender and mobile receiver will be discussed. Initially the receiver 820a would send a trigger to a rendezvous point 113 with the service identifier ID and forwarding path H-LSP 114 from 113 to 820a. The sender 822a would map an identifier ID to a forwarding path H-LSP 115 from the sender 822a to the rendezvous point 113 containing the trigger placed from the receiver 820a. The rendezvous point would concatenate the H-LSPs 115 and 114 completing the forwarding path from the sender to the receiver. The resulting H-LSP 116 would be used by the sender to forward the requested service packets to the receiver 820a. Assuming the sender remains stationary at 822a and the receiver moves along path 833. The receiver 820b would only need to send a new trigger with the same identifier ID and new forwarding path 117 to the rendezvous point 113. The sender 822a would map an identifier ID to a forwarding path H-LSP 115 from the sender 822a to the rendezvous point 113 containing the trigger placed from the receiver 820b. The rendezvous point would concatenate the H-LSPs 115 and 117 completing the forwarding path from the sender to the receiver. The resulting H-LSP 832 would be used by the sender to forward the requested service packets to the receiver 820b. This was illustrated with a constant rendezvous point, but the rendezvous point could change as the receiver moved.

The next case will illustrate mobile receiver and sender with a changing rendezvous point. In FIG. 30 the initial location for the receiver is 820a and the sender 822a. Initially the receiver 820a would send a trigger to a rendezvous point 113 with the service identifier ID and forwarding path H-LSP 114 from 113 to 820a. The sender 822a would map an identifier ID to a forwarding path H-LSP 115 from the sender 822a to the rendezvous point 113 containing the trigger placed from the receiver 820a. The rendezvous point would concatenate the H-LSPs 115 and 114 completing the forwarding path from the sender to the receiver. The resulting H-LSP 116 would be used by the sender to forward the requested service packets to the receiver 820a. The receiver would follow the path 833 to location 820b and the sender would follow the path 834 to location 822b. Due to relational attributes, a new rendezvous point 119 is determined. The receiver 820b would only need to send a new trigger with the same identifier ID and new forwarding path H-LSP 830 to the rendezvous point 119. The sender 822b would map an identifier ID to a forwarding path H-LSP 831 from the sender 822b to the rendezvous point 119 containing the trigger laced from the receiver 820b. The rendezvous point would concatenate the H-LSPs 831 and 830 completing the forwarding path from the sender to the receiver. The resulting H-LSP 835 would be used by the sender to forward the requested service packets to the receiver 820b.

Figure 31:
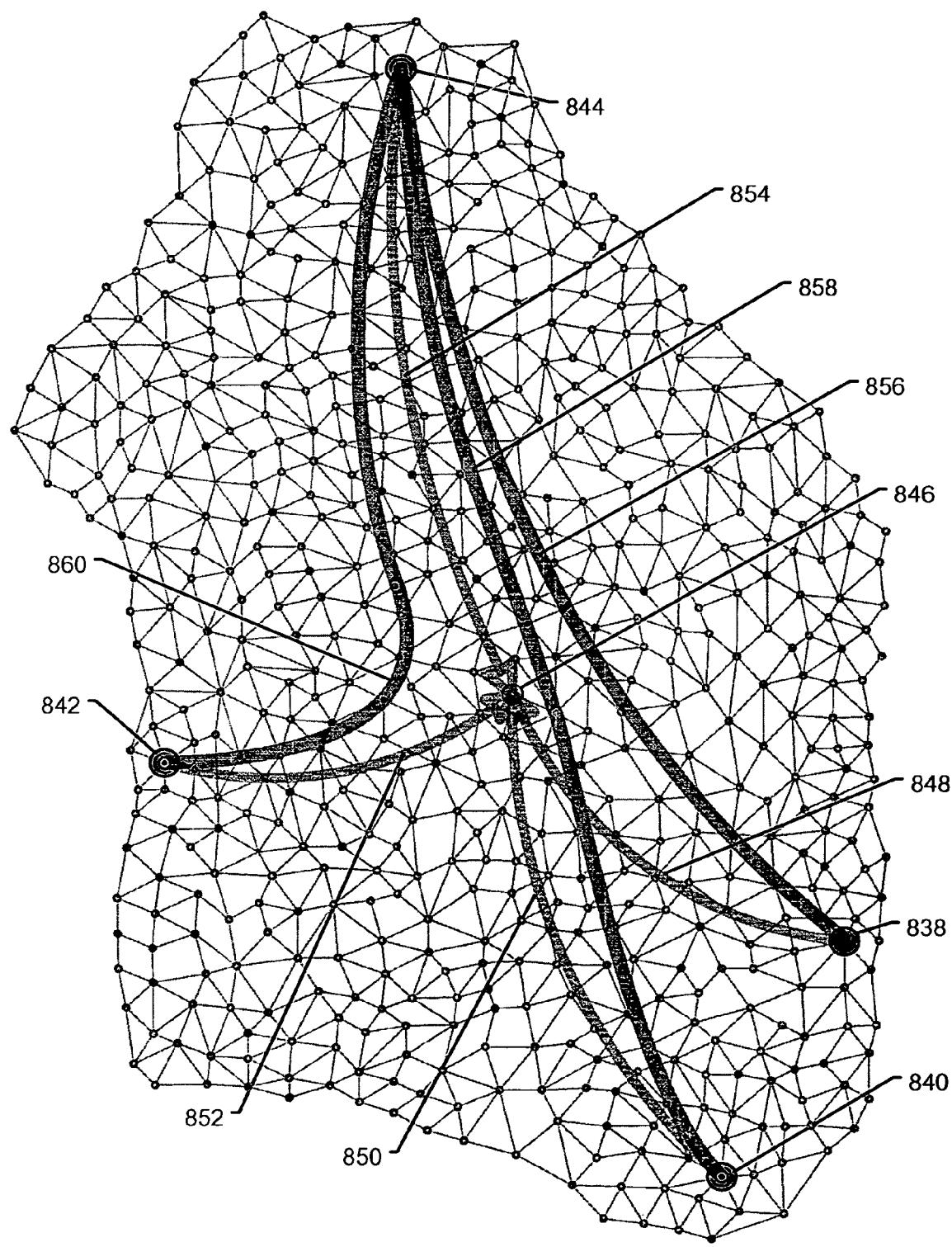
FIG. 31 illustrates Small World Infrastructure rendezvous based communications from sender to receiver for a multicast indirection service.

Multicast service is illustrated in FIG. 31 for a sender 844 and three receivers 838, 840 and 842. For simplicity, we will assume a single rendezvous point 846, but multiple rendezvous points are just as practical without further complexity. Each of the receivers 838, 840 and 842 would place a trigger at the rendezvous point 846 with the same identifier ID. Receiver 838 would place a trigger at the rendezvous point 846 with the service identifier ID and forwarding path H-LSP 848 from 846 to 840. Receiver 840 would place a trigger at the rendezvous point 846 with the service identifier ID and forwarding path H-LSP 850 from 846 to 840, Receiver 842 would place a trigger at the rendezvous point 846 with the service identifier ID and forwarding path H-LSP 852 from 846 to 842. The sender 844 would map an identifier ID to a forwarding path H-LSP 854 from the sender 844 to the rendezvous point 846 containing the triggers placed from the receivers 838, 840 and 842. The rendezvous point would concatenate the H-LSP 854 to a point-to-multipoint H-LSP containing the receiver forwarding paths H-LSP 848, H-LSP 850 and H-LSP 852 completing the forwarding paths from the sender to the receivers. The resulting point-to-multipoint H-LSP would effectively be equivalent to H-LSP 856, H-LSP 858 and H-LSP 860, but with the multicasting occurring at the rendezvous point 846.

Figure 32:
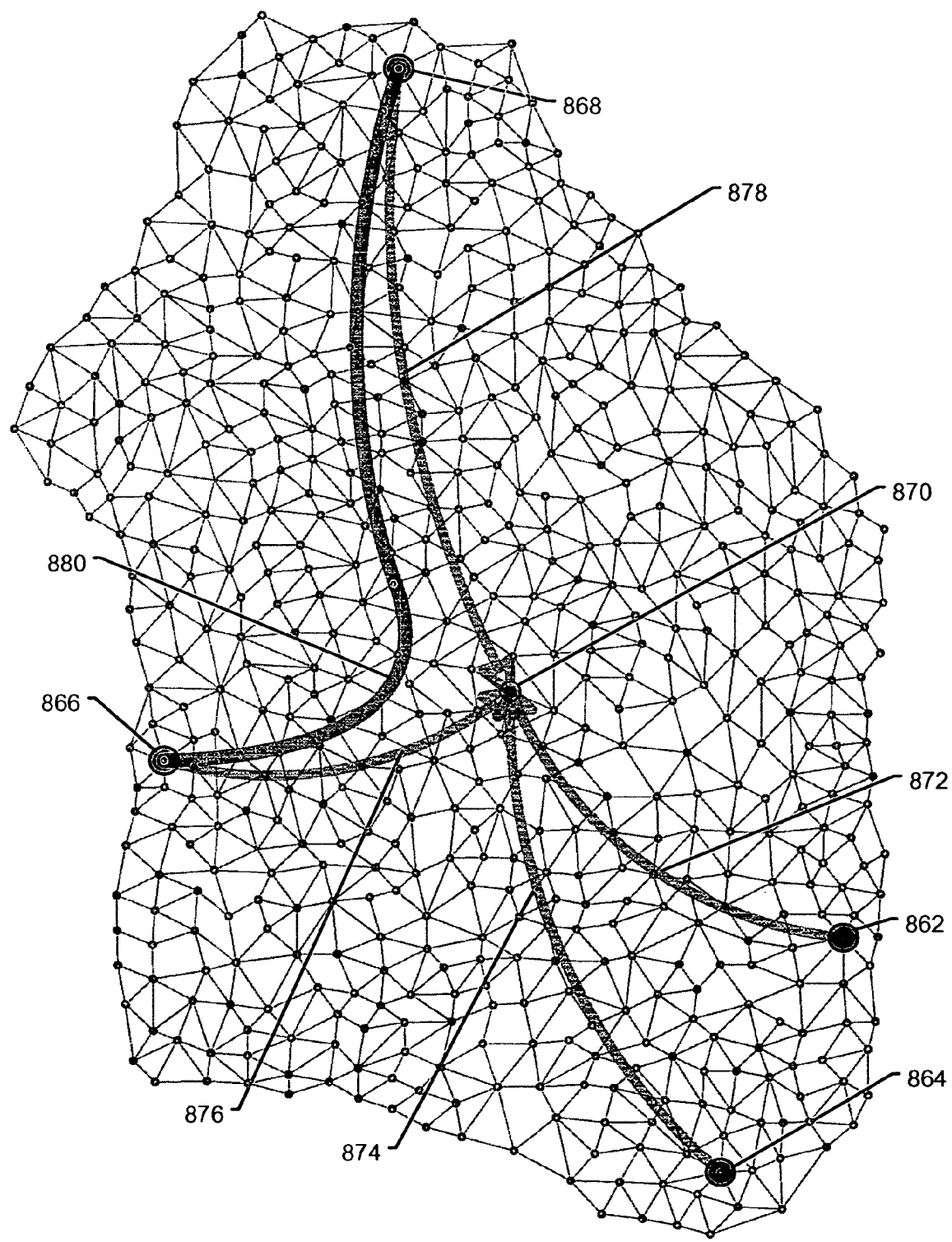
FIG. 32 illustrates Small World Infrastructure rendezvous based communications from sender to receiver for an anycast indirection service.

Anycast service is illustrated in FIG. 32 for a sender 868 and the three receivers 862, 864 and 866 in an anycast group. For simplicity, we will assume a single rendezvous point 870, but multiple rendezvous points are just as practical without further complexity. Each of the receivers 862, 864 and 866 would place a trigger at the rendezvous point 870 with the same anycast group identifier ID. The SWI model offers a great deal of flexibility allowing the identifier ID to be m-bits string, which ranges from fixed length static key for database query to variables length string with embedded active program. Additionally, the ID matching rules can be just as flexible extending the flexibility to the services provided by the receiver and sender. The ID matching functions plays a key role in anycast H-LSP construction. For example, but not limited to, a very simple case of a matching rule for anycast in SWI with fixed length ID is all hosts in an anycast group maintain triggers which are identical in the k most significant bits. These k bits play the role of the anycast group identifier. To send a packet to an anycast group, a sender uses an identifier whose k-bit prefix matches the anycast group identifier. The packet is then delivered to the member of the group whose trigger identifier best matches the packet identifier according to the longest prefix matching rule. Each matching trigger creates a H-LSP from the sender to one of the receivers in the group. Receiver 862 would place a trigger at the rendezvous point 870 with the anycast ID and forwarding path H-LSP 872 from 870 to 862. Receiver 864 would place a trigger at the rendezvous point 870 with the anycast ID and forwarding path H-LSP 876 from 870 to 864. Receiver 866 would place a trigger at the rendezvous point 870 with the anycast ID and forwarding path H-LSP 876 from 870 to 866. The sender 868 would map an identifier ID to a forwarding path H-LSP 878 from the sender 868 to the rendezvous point 870 containing the triggers placed from the receivers 862, 864 and 866. In this case assume the best match is to the trigger ID from receiver 866. The rendezvous point 870 would concatenate the H-LSP 878 and H-LSP 876 completing the forwarding path from the sender to the receiver. The resulting H-LSP 880 would be used by the sender to forward the requested service packets to the receiver 866.

Figure 33:
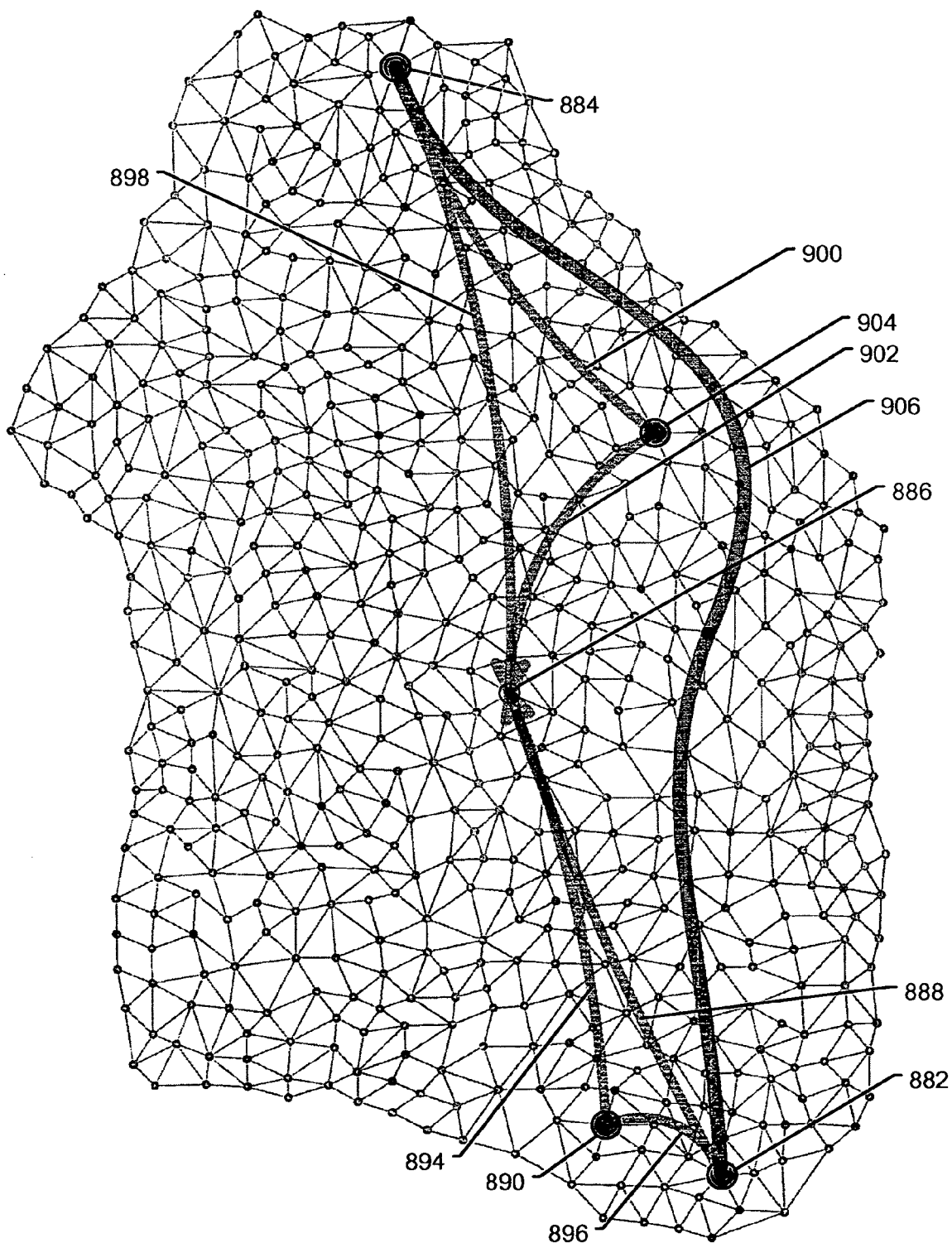
FIG. 33 illustrates ID stacking in Small World Infrastructure rendezvous based communications from sender to receiver for indirection service.

The SWI service model allows extensions to the basic identifier ID within the sender mappings and receiver triggers. The identifier ID would be replaced by a stack of identifiers IDstack(receiver) for the receiver and IDstack(sender) for the sender adding versatility and flexibility to the service model. A general stack of IDs can provide service composition from both the sender and receiver. The IDstack(receiver) allows the forwarding of a packet to a series of identifiers such as shown in FIG. 33. A receiver 882 will place a trigger at the rendezvous point 886. The trigger would be composed of a stack of identifiers, two in this case. The identifiers would provide the service and forwarding path H-LSP 894 to redirect the packet to 890 for intermediate service prior to forwarding to the receiver 882 using H-LSP 896. This trigger would be identified by its association with a service requested by 882 and the forwarding path from the rendezvous point 886 to the receiver 882. This intermediate service is independent of the sender and can remain transparent.

The sender 884 would map a stack of identifiers IDstack (sender) to a forwarding path H-LSP 898 from the sender 884 to the rendezvous point 886 containing the trigger placed from the receiver 882. The service packet would be forwarded to 904 using H-LSP 900 for service intermediate to being forwarded to the rendezvous point 886 using, H-LSP 902. This intermediate service is independent of the receiver and can remain transparent. The rendezvous point would concatenate the H-LSPs 898 and 888 completing the forwarding path from the sender to the receiver. The resulting H-LSP 906 would be used by the sender to forward the requested service packets to the receiver 882. The packets, however, would be redirected to service nodes 904 and 890 prior to receiver 882.

Figure 34:
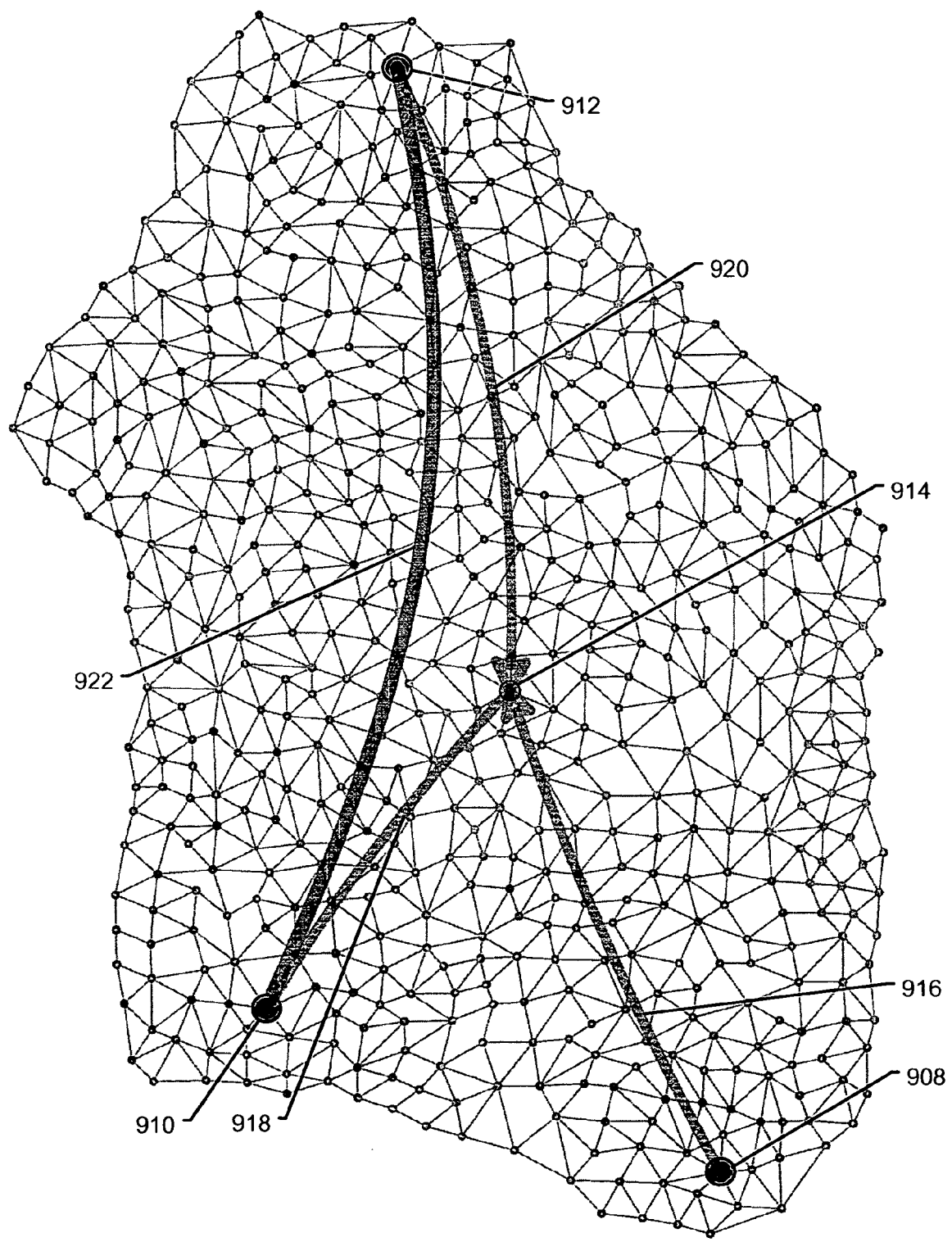
FIG. 34 illustrates generalized trigger in Small World Infrastructure rendezvous based communications from sender to receiver for indirection service.

The trigger can also be generalized to offer redirection of the packet. In FIG. 34, a receiver 908 would place a trigger at the rendezvous point 914, containing an identifier ID but the forwarding path would be an H-LSP 918 instead of H-LSP 916 to the receiver. The sender 912 would map an identifier ID to a forwarding path H-LSP 920 from the sender 912 to the rendezvous point 914 containing the trigger placed from the receiver 908. The rendezvous point would concatenate the H-LSP 922 and H-LSP 918 completing the forwarding path from the sender to the destination receiver 910. The resulting H-LSP 922 would be used by the sender to forward the requested service packets to the destination receiver 910.

This invention has been described utilizing specific examples; a person skilled in the art will understand that there are numerous permutations and variations of the described methods and techniques that are within the scope of the invention.

What is claimed is:

1. A method for providing a communication path between communication units (CUs) of a general packet communications network, comprising:
   providing a first $CU_a$ and a second $CU_b$ having an existing communications relationship $R_{ab}$ between the first $CU_a$ and the second $CU_b$ including a first hierarchical forwarding path $HFP_{ab}$ between $CU_a$ and $CU_b$, wherein $CU_b$ is a rendezvous point selected by $CU_a$ based on at least one relational attribute associated with $CU_b$, and wherein $CU_b$ includes a trigger that includes an identifier and $HFP_{ab}$;
   providing a third $CU_c$ having an existing communications relationship $R_{bc}$ between the second $CU_b$ and the third $CU_c$ including a second hierarchical forwarding path $HFP_{bc}$ between $CU_b$ and $CU_c$, wherein $CU_c$ provides a service associated with the identifier and maps the identifier to $HFP_{bc}$;
   constructing a communications relationship $R_{ac}$, by $CU_b$, between the $CU_a$ and the $CU_c$ including establishing a hierarchical forwarding path $HFP_{ac}$ between the $CU_a$ and the $CU_c$ and through the $CU_b$;
   defining an exploring region within the general packet communications network between the first communication unit $CU_a$ and the third communication unit $CU_c$, wherein the exploring region is defined by a group of CUs in which the CUs within the group can communicate with one another independent of communications relationship $R_{ac}$; and
   wherein the exploring region has first and second CUs in which there is a direct communication path between the two units and at least one third CU between the two CUs, wherein there is a first lower layer HFP between the first CU and the second CU and a second lower layer HFP between the second CU and the third CU, and wherein the first lower layer HFP and the second lower layer HFP are concatenated to create a higher layer HFP.

2. A method, according to claim 1, wherein the step of constructing the communications relationship $R_{ac}$ comprises establishing the relationship $R_{ac}$ recursively from the existing relationship $R_{ab}$ and the existing relationship $R_{bc}$.

3. A method, according to claim 1, wherein the step of constructing the hierarchical forwarding path $HFP_{ac}$ comprises establishing the $HFP_{ac}$ recursively from the $HFP_{ab}$ and the $HFP_{bc}$.

4. A method, according to claim 1, further comprising providing each of the CUs with at least one identifier.

5. A method, according to claim 4, wherein the identifier is structured and dependent on the topology of the general packet communications network.

6. A method, according to claim 4, wherein the identifier is unstructured and not dependent on the topology of the general packet communications network.

7. A method, according to claim 1, wherein the exploring region is defined by an individual CU.

8. A method, according to claim 1, wherein the higher layer HFP has a packet forwarding behavior which forwards a packet from the $CU_a$ to the $CU_c$.

9. A method, according to claim 8, further comprising encoding the packet forwarding behavior in a table at each CU involved in the creation of the higher layer HFP.

10. A method, according to claim 8, comprising encoding the packet forwarding behavior at a header of each packet being communicated between the $CU_a$ and the $CU_c$.

11. A method, according to claim 8, comprising encoding the packet forwarding behavior in a table at each CU involved in the creation of the higher layer HFP and at a header of the packet being communicated between the $CU_a$ and the $CU_c$.

12. A method, according to claim 1, wherein the step of establishing the hierarchical forwarding path $HFP_{ac}$ comprises providing a sequence of local labels assigned by each CU in the $HFP_{ac}$.

13. A method, according to claim 1, wherein the step of establishing the hierarchical forwarding path $HFP_{ac}$ comprises providing a sequence of global labels assigned globally.

14. A method, according to claim 1, wherein the step of establishing the hierarchical forwarding path $HFP_{ac}$ comprises providing a sequence of identifiers of those CUs along the $HFP_{ac}$.

15. A method, according to claim 1, wherein the step of establishing the hierarchical forwarding path $HFP_{ac}$ comprises providing a sequence of identifiers of the CU which is at the source of the $HFP_{ac}$ and the CU which at the destination of the $HFP_{ac}$.

16. A method, according to claim 1, wherein the step of establishing the hierarchical forwarding path $HFP_{ac}$ comprises providing a sequence of identifiers of each CU in the $HFP_{ac}$, including identifiers at a source CU, at a destination CU and at any CU between the source CU and the destination CU.

17. A method, according to claim 1, further comprising establishing a plurality of hierarchical forwarding path HFPs within the general packet communications network, and creating a relationship by grouping one or more of the HFPs and assigning one or more attributes to the group of HFPs.

18. A method, according to claim 1, further comprising forming a small world graph within the general packet communications network, including allowing each communications unit CU in the small world graph to select other CUs in the small world graph as contacts, and constructing and maintaining relationships to those contacts.

19. A method, according to claim 1, wherein each CU selects another CU as a rendezvous CU, constructs and maintains a relationship with the rendezvous CU, and registers at least one identifier to the rendezvous CU.

20. A method, according to claim 1, wherein the $CU_a$ initiates a packet communication to the $CU_b$, and wherein A is an identifier of one CU and B is an identifier of one or more CUs.

21. A method, according to claim 1, further comprising searching contacts recursively by the communications unit $CU_a$ by matching the attributes of the relationship until the communications unit $CU_b$ or a rendezvous communications unit CU of $CU_b$ is located.

22. A method, according to claim 1, further comprising constructing at least one relationship along a search path from the communications unit $CU_a$ to a rendezvous CU, the rendezvous CU concatenating a hierarchical forwarding path HFP from the $CU_a$ to the rendezvous CU and concatenating at least one hierarchical forwarding path HFP from the rendezvous CU to the $CU_b$ to create the new relationship from $CU_a$ to $CU_b$.

23. A method, according to claim 1, further comprising eliminating redundant communications units CUs in $HFP_{ac}$ in order to optimize the communication path.

24. A method, according to claim 1, further comprising exploring alternative HFPs having lower costs than the $HFP_{ac}$.

25. A method, according to claim 1, further comprising creating HFP forwarding packets in the direction from the communications unit $CU_a$ to the communications unit $CU_b$ and from the communications unit $CU_b$ to the communications unit $CU_a$.

26. A method, according to claim 25, wherein the $CU_b$ initiates the construction of the reverse communication path from the $CU_b$ to the $CU_a$.

* * * * *

UNITED STATES PATENT AND TRADEMARK OFFICE
CERTIFICATE OF CORRECTION

PATENT NO. : 7,616,632 B2  Page 1 of 1
APPLICATION NO. : 10/891872
DATED : November 10, 2009
INVENTOR(S) : Loa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1343 days.

Signed and Sealed this

Nineteenth Day of October, 2010

David J. Kappos
*Director of the United States Patent and Trademark Office*